June 19, 1945. R. ANSCHÜTZ ET AL 2,378,527

TYPEWRITER CALCULATING MACHINE

Filed May 31, 1940 21 Sheets-Sheet 1

Inventors,
R. Anschütz &
E. H. Hämmel
By: Glascock Downing
& Seebold Attys.

June 19, 1945.  R. ANSCHÜTZ ET AL  2,378,527
TYPEWRITER CALCULATING MACHINE
Filed May 31, 1940  21 Sheets-Sheet 10

Inventors,
R. Anschütz &
E. H. Kimmel
By: Glascock Downing & Seebold
Attys.

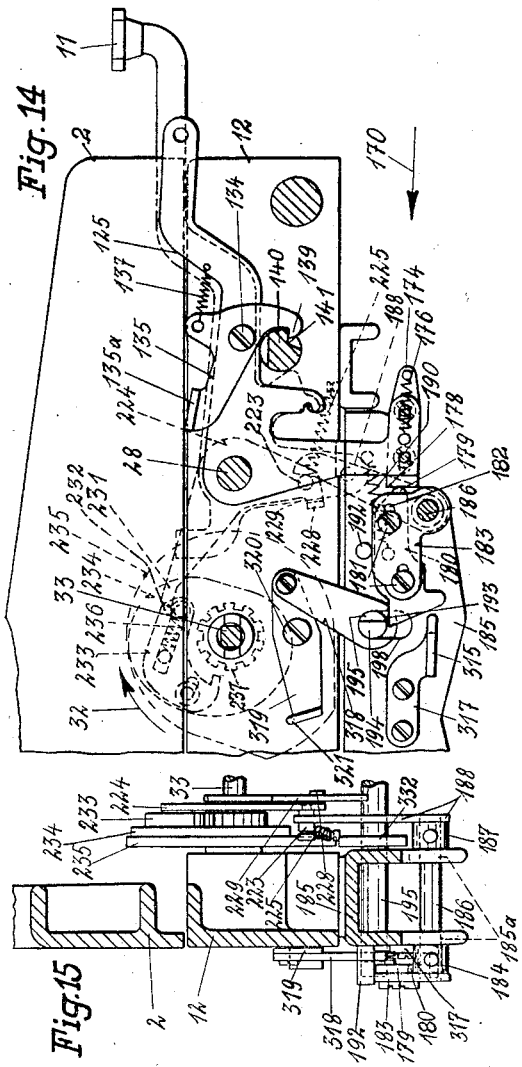

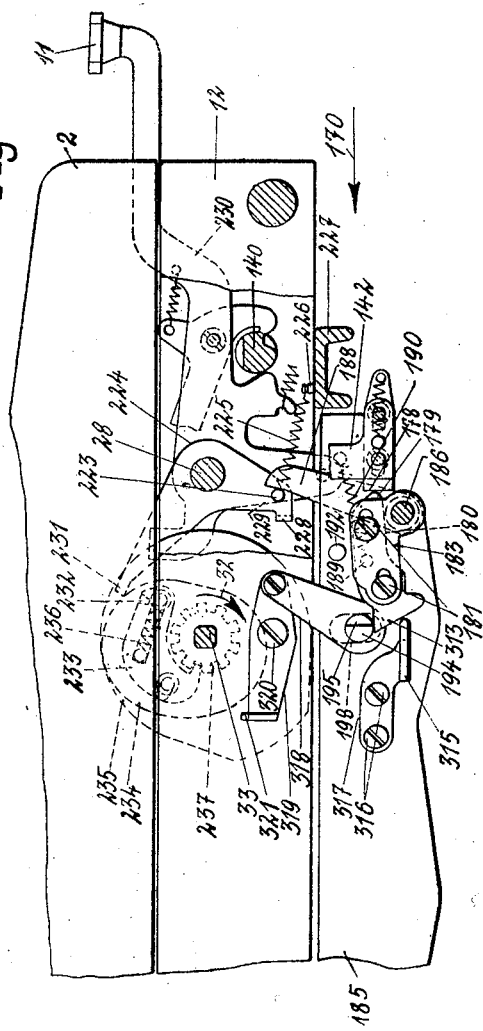

June 19, 1945. R. ANSCHÜTZ ET AL 2,378,527
TYPEWRITER CALCULATING MACHINE
Filed May 31, 1940 21 Sheets-Sheet 16
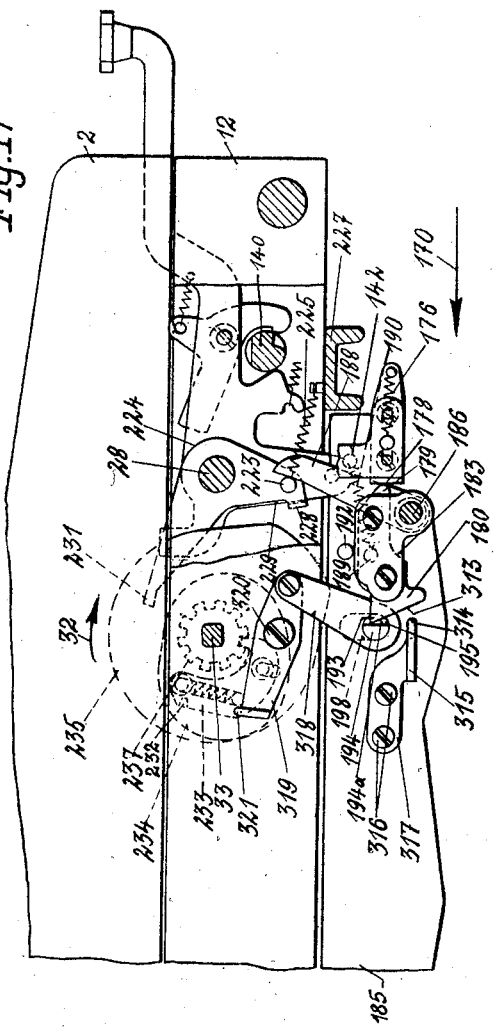
Inventors,
R. Anschütz
E. H. Kammel
by Glascock Downing & Seebold
Attys.

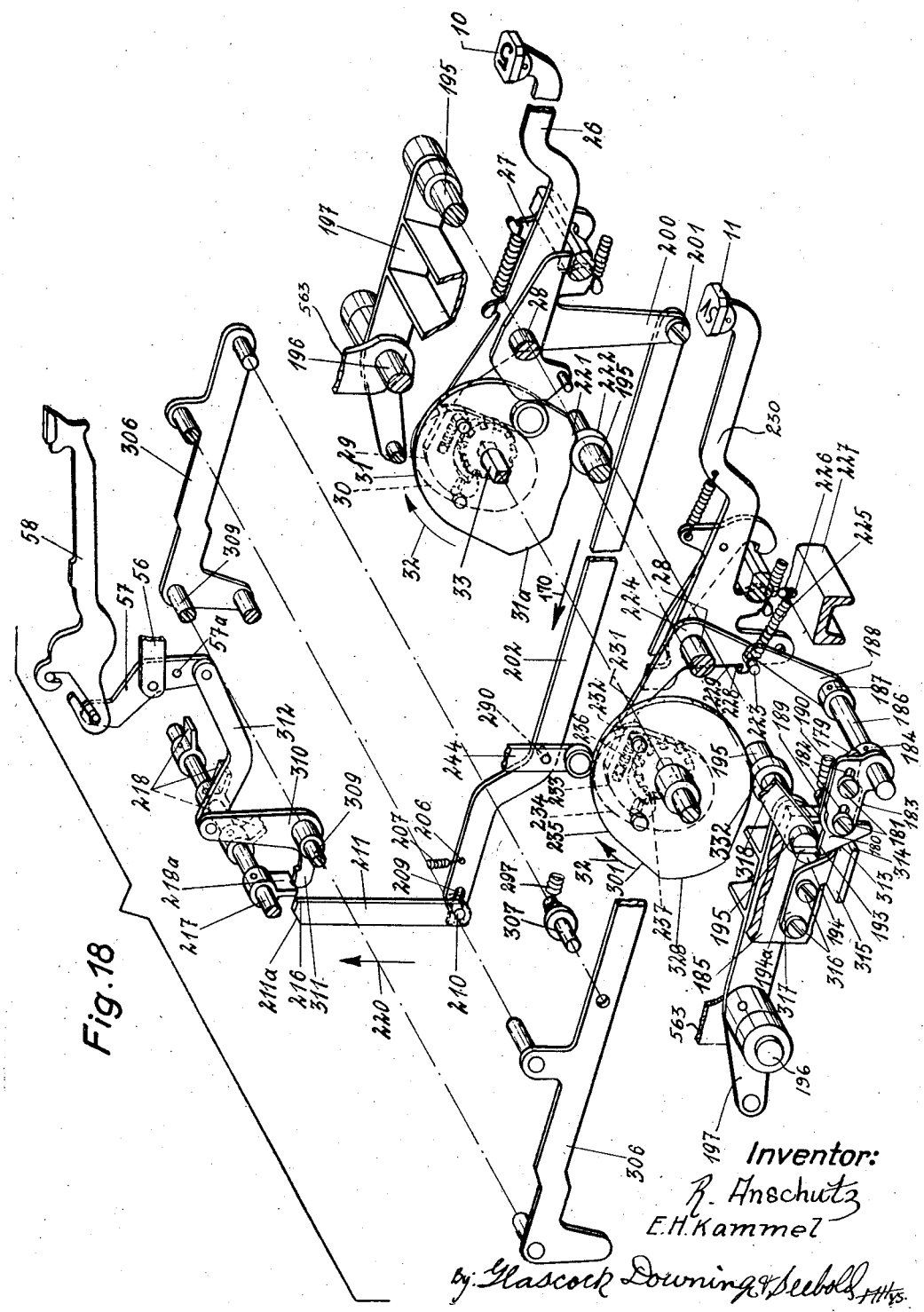

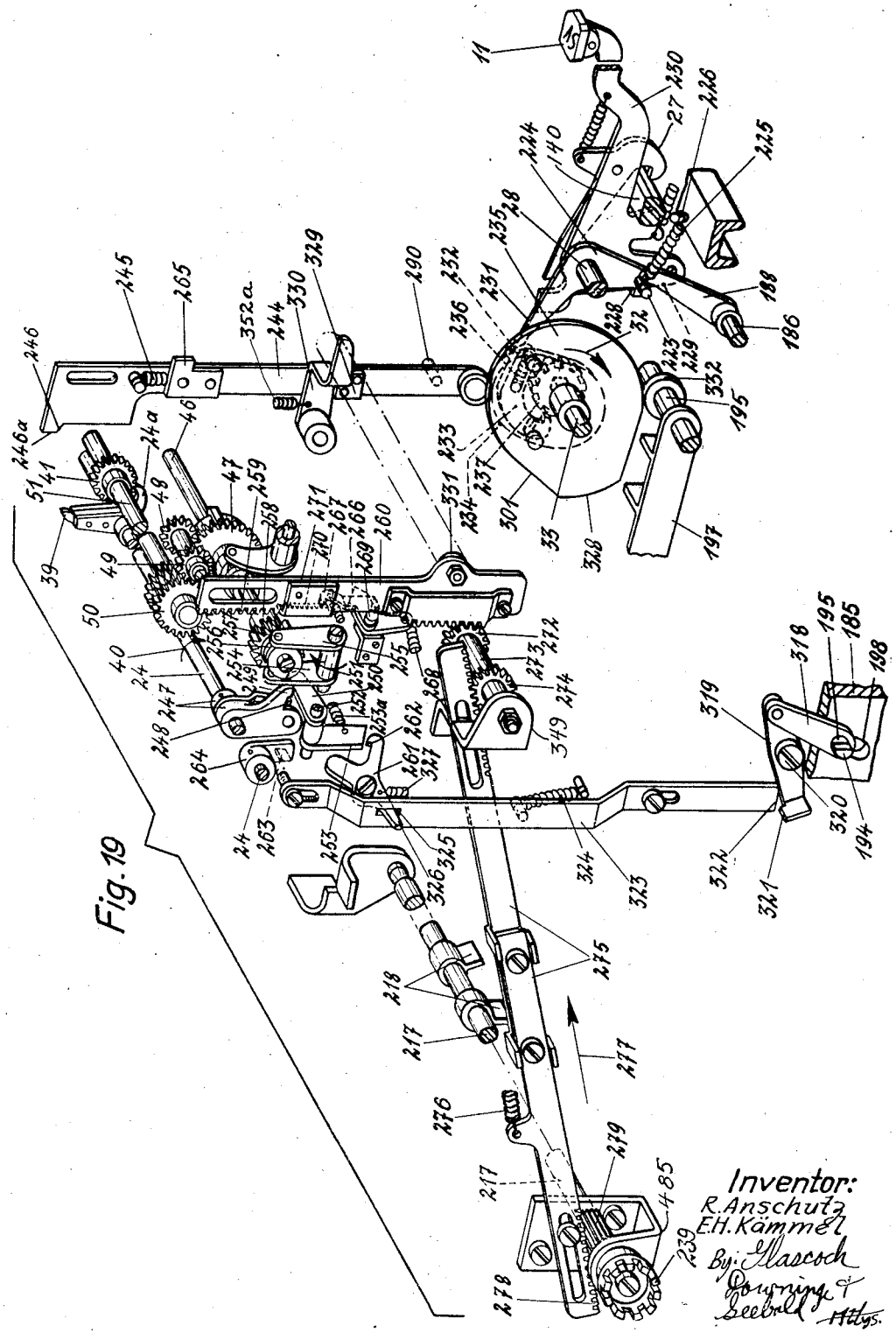

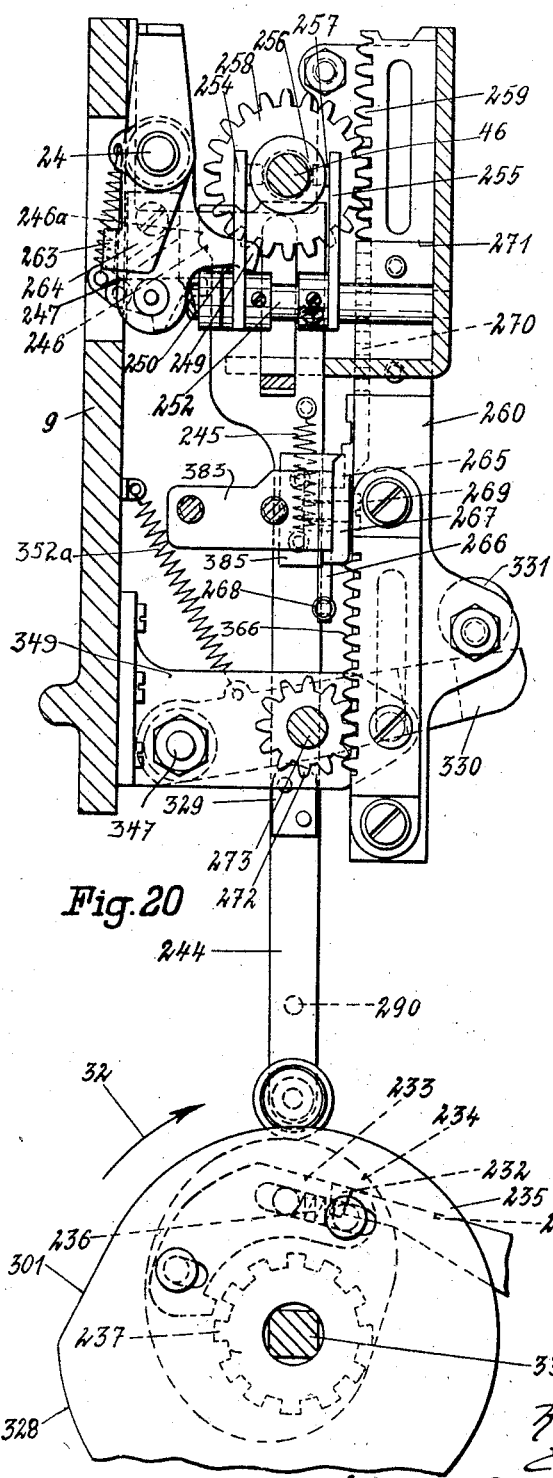

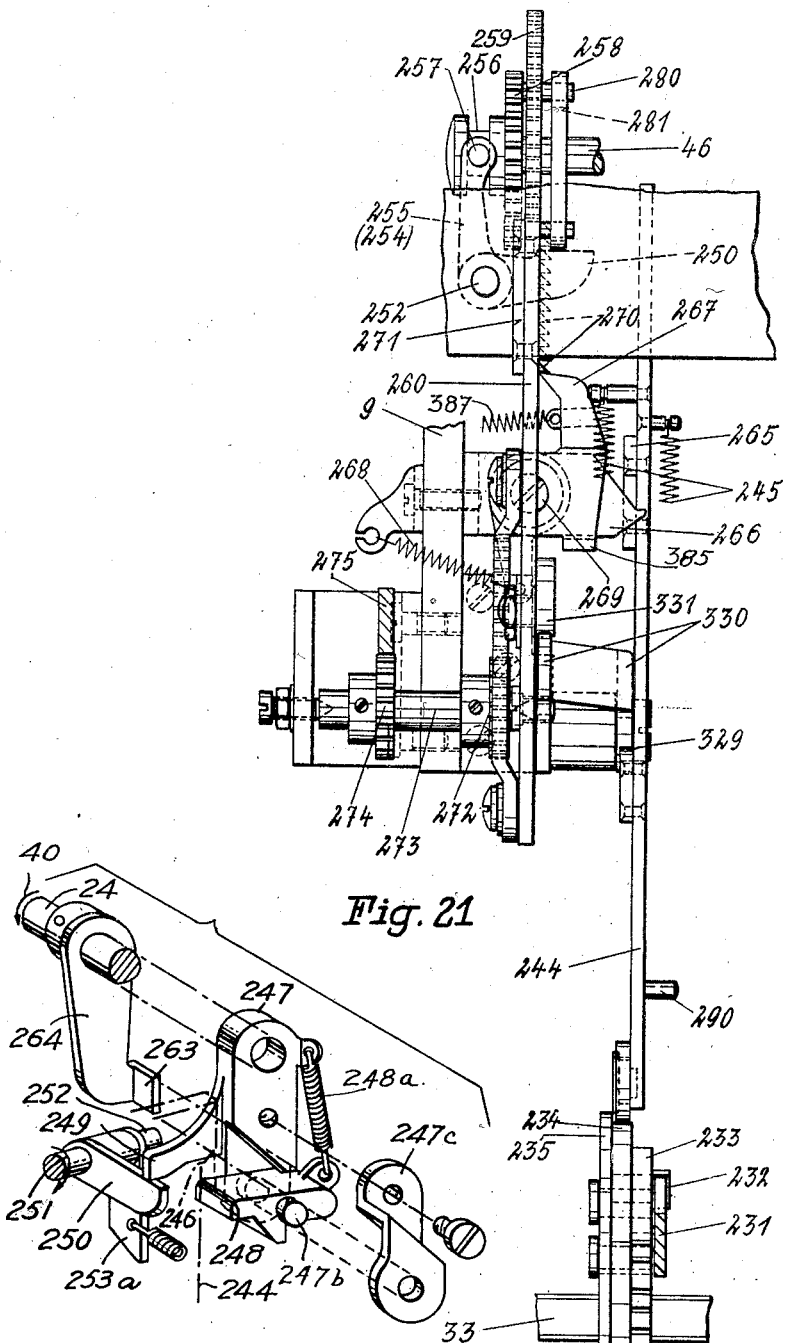

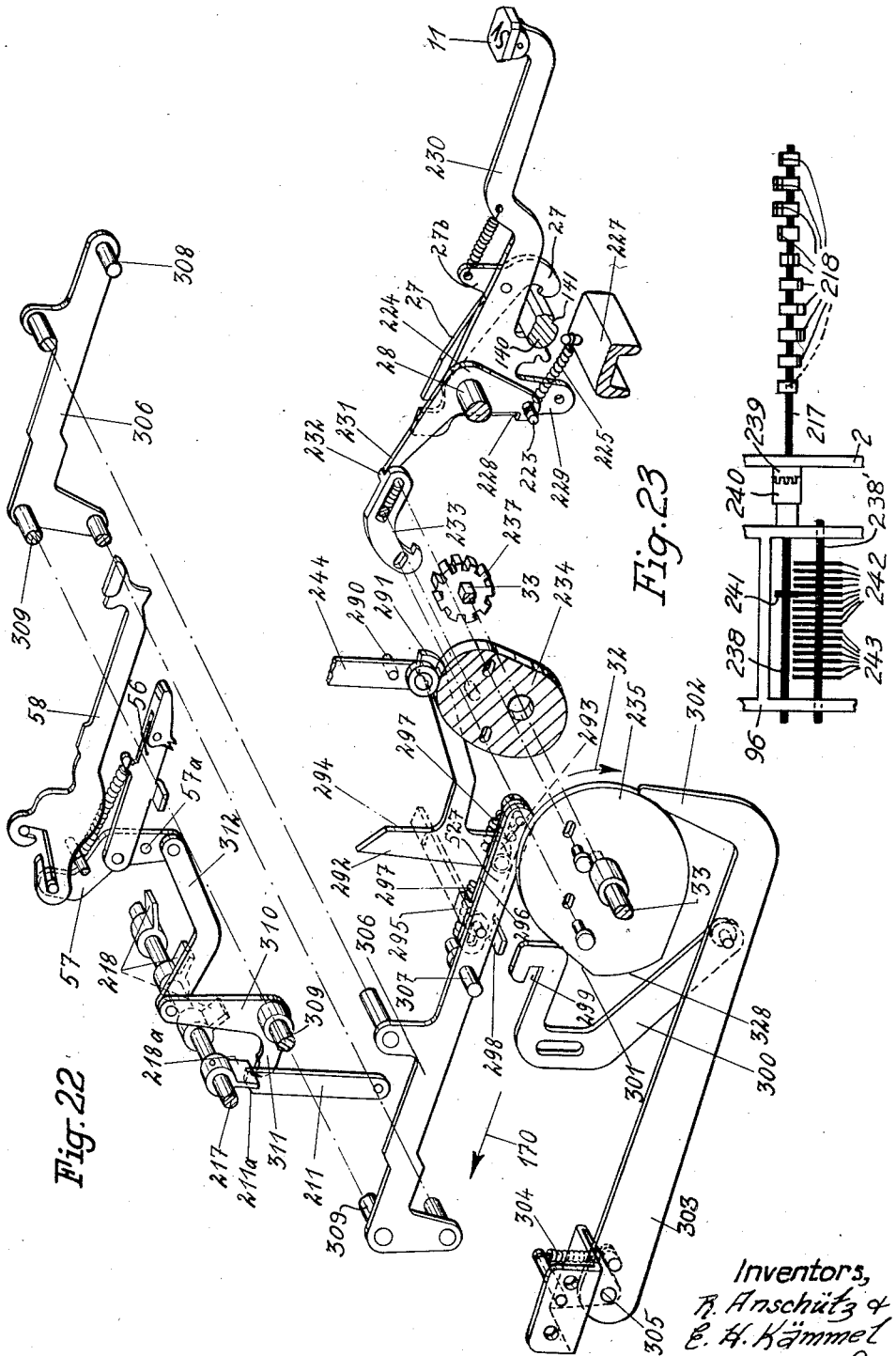

Patented June 19, 1945

2,378,527

UNITED STATES PATENT OFFICE 2,378,527

TYPEWRITER CALCULATING MACHINE

Robert Anschütz and Ernst Hugo Kämmel, Zella-Mehlis, Thuringia, Germany; vested in the Alien Property Custodian Application May 31, 1940, Serial No. 338,272
In Germany July 10, 1939

19 Claims. (Cl. 235—59)

This invention relates to an accounting machine, particularly a typewriting-calculating machine. Such machine may have totalizers operable by a master wheel mechanism under control of numeral keys, and may also have total-taking control mechanism.

Numerous devices have already been proposed with a view to also carry out multiplications on typewriting-calculating machines, since only then a really useful accounting-machine would be obtained. With the machines of this kind on the market the multiplication was effected by an electrically controlled device consisting of certain contacts and magnets. This mechanism, however, proved to be a constant source of trouble which developed in the electric circuits and was difficult to locate and repair.

These and other disadvantages are avoided in the present invention by providing a novel organization which may include a control device settable to render ineffective the control of the numeral keys over the regular amount-entering means and instead, to enable the numeral keys to enter factors in a multiplication mechanism incorporated in the machine.

Fig. 14 is a left side view of the preparatory mechanism in its set position.

Fig. 15 is a front view of the parts shown in Fig. 14.

Fig. 16 is a left side view of the device, according to Fig. 14, showing some parts, however, in further operated position.

Fig. 17 is a left side view of the device according to Fig. 14, showing some parts in non-operative position.

Fig. 18 is a left front perspective view of several adjustment- and control parts for the multiplication conditioning device, in which for better illustration, some parts are shown disjoined from each other as well as broken away.

Fig. 19 is a left front perspective view of some gears of the total-taking control mechanism, in which for better illustration some parts are shown disjoined from each other as well as broken away.

Fig. 19a is a detail of Fig. 19.

Fig. 20 is a left side view of some parts shown in Fig. 19.

Fig. 21 is a front view of the parts positioned according to Fig. 20.

Fig. 22 is a left front perspective view of the recording device and the total-taking control mechanism, in which for clearer view some parts are shown remote from each other as well as broken away.

Fig. 23 is a diagrammatic view of the device for introducing and receiving or storing the multiplication factors.

General description of the machine

One of the important aims of this invention is the provision of novel and effective means to couple a power-driven typewriting-accounting machine of well-known manufacture preferably equipped for total taking, with a convenient multiplying mechanism which preferably, may be built in with the power-driven typewriting-accounting machine.

And in furtherance of this aim, we have endeavored to utilize the regular equipment of the typewriting accounting machine, to enter the factors, that is, the multiplier and the multiplicand, into the multiplying mechanism, without interference with the normal or primary functions of the mechanisms of the typewriting-accounting machine.

To these and other ends, a part of the total taking control mechanism of the typewriting-accounting machine has been adapted to control the entry of the factors into the multiplying mechanism, utilizing the same motor which drives the typewriting-accounting machine, to actuate the mechanisms effecting the entry of the factors and to set the conditioning means by which the typewriting-accounting machine is enabled to effect such entry.

By adapting certain of the elements of a power-driven automatic total taking typewriting-accounting machine of the prior art to effect the objects of this invention, such elements constitute combinations with the novel features of this invention.

For example, by the use of a typewriting-accounting machine, in the addition and subtraction of the basic items of a calculation, said items being entered in the totalizer under control of the calculating keys, certain amounts or results may be registered on the totalizers of the machine, which amounts constitute the factors of a multiplication.

These registered amounts or totals may be automatically printed and the totalizers cleared or not, as desired, depending upon whether a total and clearing key or a sub-total key is depressed, there being an interlock preventing depression of a total conditioning key while a calculating key is effective and vice versa, all disclosed in the prior art.

The present invention resides in the idea of associating a multiplying mechanism with the printing mechanism of the typewriting-accounting machine to enter the factors digit by digit into the respective factor-representing means of the multiplying mechanism, as the factors are printed digit by digit by said printing mechanism.

Invention also resides in the idea of providing means to condition the typewriting-accounting machine for entering the factors into the multiplying mechanism by a total taking operation, while preventing effective operation of the differential members individual to the calculator keys despite the depression of the calculating keys corresponding with the digits of the factors.

Figure 1:
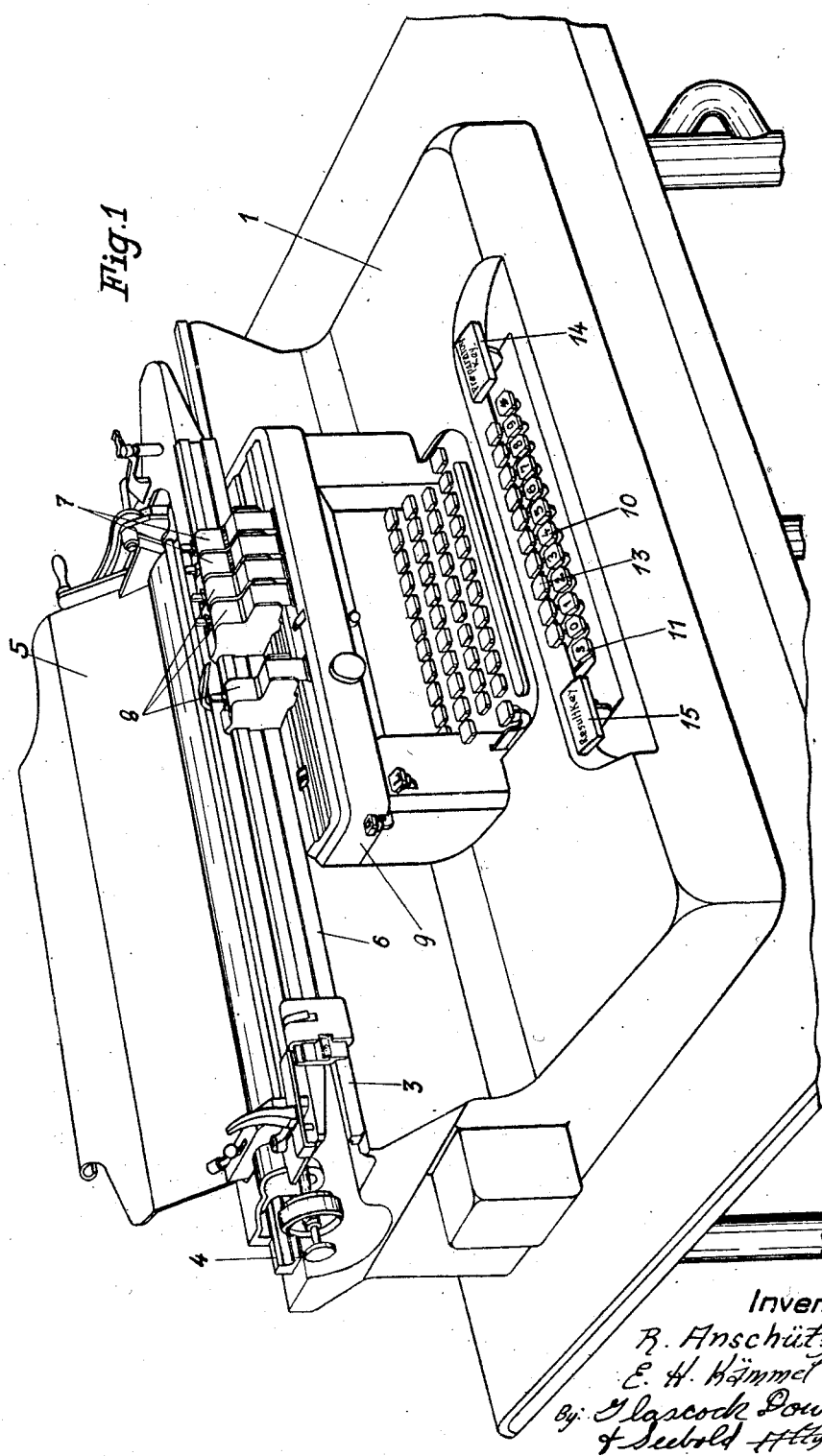
Fig. 1 is a left front perspective view of a typewriting calculating machine constructed according to the invention.
Figure 2:
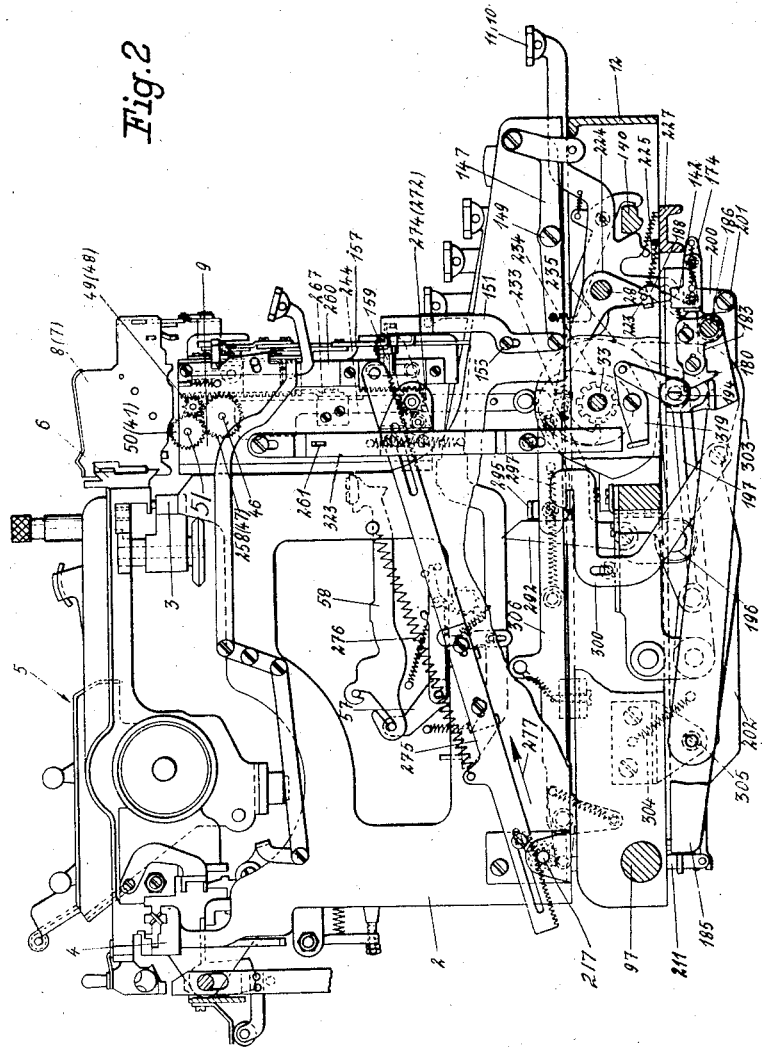
Fig. 2 is a left side view of the typewriting-calculating machine in which for better display of the single parts, the coverplate as well as the multiplication device have been omitted, and the machine frame is shown partly broken away.
Figure 3:
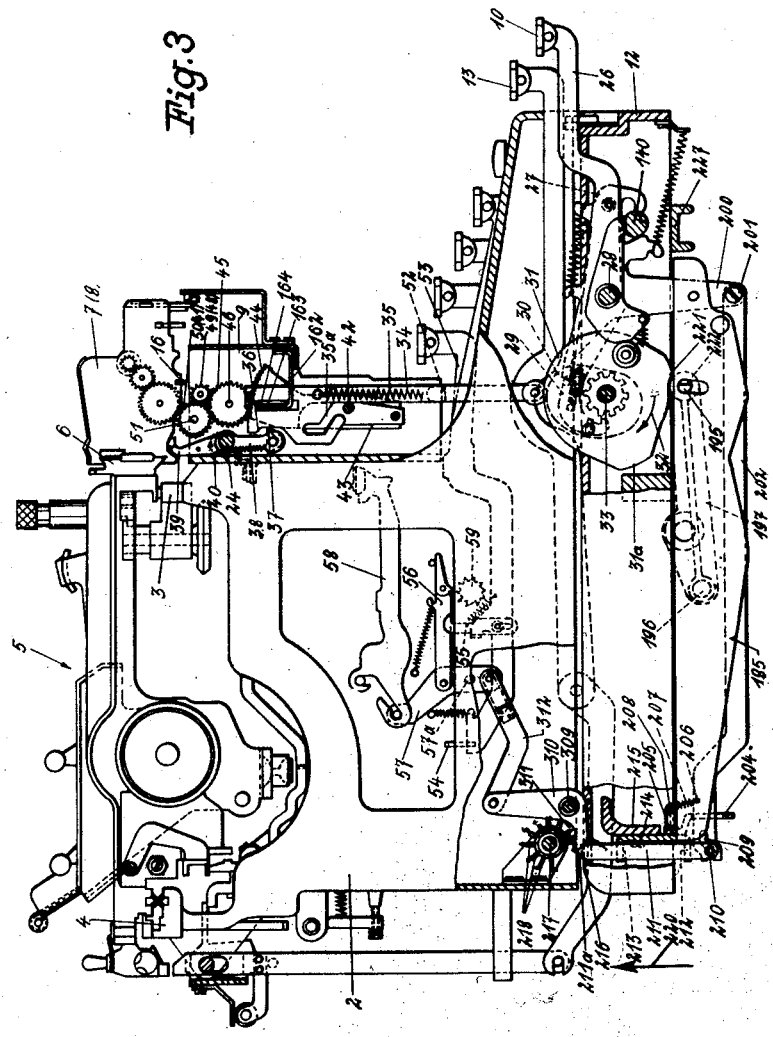
Fig. 3 is a left side view of the machine, according to Fig. 2, in which mainly the calculating features are shown.
Figure 11:
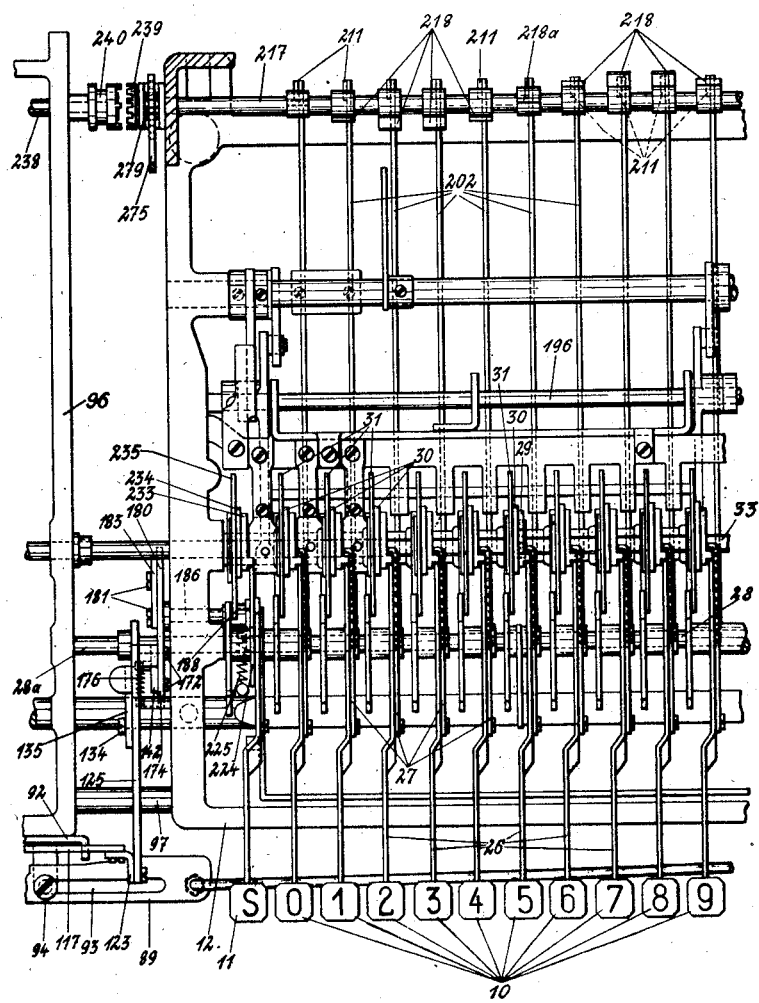
Fig. 11 is a plan view of the base of the machine with some parts broken away.

The typewriting-calculating machine includes a frame 2, Figs. 2 and 3, enclosed within a housing or case, Fig. 1, the frame supporting the typewriting-calculating mechanism. A paper carriage 5 is mounted to slide on the transverse rails 3 and 4 of the frame 2. A number of column totalizers 7 and dummy totalizers 8 are located on a suspension rail 6 attached to the paper carriage 5. A differential mechanism 9 is mounted on the front of the frame 2 to enter amounts into the column totalizers 7 under control of the calculating or numeral keys 10 and the rotary control units 29, 30, 31, Fig. 3, cooperating therewith. For the purpose of automatically typing a sum which has been calculated in one of the column totalizers 7, a total-taking control mechanism according to application for U. S. Patent, Serial No. 146,897, now Patent No. 2,347,235, issued April 25. 1944, has been provided and includes a total key 11 and a rotary control unit 233, 234, 235, Fig. 2. The keys 10 and 11 as well as their respective rotary units are arranged in a supporting sub-frame 12 located below the frame 2, Figs. 2, 3, 11. A decimal tabulator keyboard 13, Figs. 1 and 3, located behind the row of calculating keys 10 within a suitable recess formed in the front of the casing on a plane beneath the regular machine keyboard, makes it possible to tabulate the paper carriage 5 into the required position.

Means is provided under control of a preparatory key 14, located to the right of the row of calculating keys, to condition the typewriting-accounting mechanism for registering the factors for a multiplying operation in the multiplying mechanism, as well as to render ineffective the calculating key-controlled differential members.

This preparatory or factor-entering conditioning means is automatically latched in its effective position.

Subsequent to the entry of the factors into the multipying mechanism, a special key 15 located at the left of the row of calculating keys is depressed to effect actuation of the multiplying mechanism by means not shown.

A motor, not shown, mounted on the right of the supporting frames of the typewriting-accounting machine, operates through well-known means disclosed, for instance, in U. S. Patent to Kämmel, 2,236,642, April 1, 1941, to drive the various devices controlled by the culculating keys 10, the total key 11 and the conditioning key 14, as well as the printing mechanism under control of the alphabetic keys and the totalizers, and the carriage return mechanism, not shown.

For a better understanding of the present invention the normal procedure of calculating addition- and subtraction values is reviewed briefly as follows:

*Normal calculating- and printing procedure when additive values are introduced*

Assume that the value "5" is to be introduced additively into one of the column totalizers 7. After the paper has been placed in the machine the proper tabulator key of the decimal tabulator keyboard 13 is operated so that the carriage is tabulated to that point at which the desired calculating wheel of the column totalizer 7 which is to receive the value "5" will be in operative position. When the column totalizer 7 has been located in the selected operative position the usual cam blade 16 depending from the bottom of the positioned column totalizer, Fig. 3, engages the nose 17, Fig. 12, of the catch lever 18 which normally locks the calculating mechanism 9, and rocks the catch lever 18 around the shaft 20 in the direction of arrow 19 so that the lug 21 of the catch lever 18 is disengaged from the recess 22 of the locking finger 25 rigidly mounted on the locking shaft 24. Now, the calculating key 10, Figs. 3 and 12, which corresponds to the figure "5" is depressed and thereby the key lever 26 as well as the key latch 27, slidably mounted on the lever, are moved clockwise around the shaft 28. Consequently the rotary unit 29, 30, 31 associated with the key lever 26 is coupled (as in Mez Patent No. 1,913,982) with the driving shaft 33, which is constantly driven by the motor in the direction of arrow 32, for a complete revolution. The rotary control unit includes the clutch pawl 29, the differential control cam 30 and the operating cam 31, the lower end of a differential actuator or slide 35 being urged by springs 34 against the periphery of the differential control cam 30, so that as the control cam unit rotates, the actuator or slide 35 follows the declining periphery of the cam 30. At the beginning of the downward movement the inclined shoulder 36, Fig. 3, of the actuator 35 acts upon the lip 37 of a totalizer lock releasing device, whereby to rock the arm 38, locking shaft 24, master wheel locking dog 24a (Fig. 19) and totalizer wheel lock-releasing finger 39 in the direction indicated by the arrow 40 whereby to disengage the well known totalizer wheel lock (not shown) for that denominational wheel of the column totalizer into which the digit represented by the depressed key is to be entered.

Such rocking of the lock shaft 24 will also disengage the master wheel dog 24a from the master wheel 41, (Figs. 3 and 19), with which the released totalizer wheel is in mesh.

The differential actuator slide 35 as it continues to descend, causes its differential cam slot 35a to operate on the rod 42 to rock the differential frame 43 and differential segment 44, which, through the usual gear train 45—50, including the differential shaft 46 (Fig. 19), enters the digit corresponding to the depressed key, into the released totalizer wheel of the column totalizer.

Shortly before the actuator 35 has finished its descent, its lug 52, Fig. 3, engages the printing key lever 53 correspondingly denominationally therewith and rocks the same clockwise around the fulcrum which, through the intermediate member 55, effects the driving connection between the draw link 56 and the fluted shaft 59 constantly driven by the motor in a clockwise direction. The resulting operation of draw-link 56, and its lever 57, operates the type lever 58 to print. Upon recoil of the type lever 58 there occurs the usual letter-feed step of the carriage. There will also have occurred suitably timed master-wheel-uncoupling operation of the aforesaid coupling means, not shown. During the continued turning of the rotary unit 29, 30, 31, the rising periphery of the cam 30 raises the actuator 35 to its original position against the action of the springs 34. Any one of the other actuators 35 is operative in like manner. At the completion of a full turn the rotary unit 29, 30, 31 is released again from the driving shaft 33 and the levers 26, 27 are moved back into normal positions.

*Total taking control mechanism*

The total taking control mechanism comprises means in addition to the means for effecting adding and subtracting operations and for printing, to clear that column totalizer which has been positioned in effective relation with the master wheel, and to effect printing of the amount registered thereon.

It will be recalled that the column totalizer master wheel 41 is fast on the master wheel shaft 51 arranged adjacent to and parallel with the locking shaft 24, (Figs. 2, 3, 19 and 20), and parallel with the differential shaft 46 on which the differential gear 45 is secured, and that the master wheel shaft 51 and differential shaft 46 are connected by the reverse gearing 47—50 (Fig. 19).

A total clearing and printing gear 258 (Figs. 19–21) is splined for axial shifting on the differential shaft 46, and is provided with laterally projecting pins 280 engaging a guide member 281 fast on the differential shaft 46, thus connecting the total clearing and printing gear with the differential shaft 46 and hence, through the reversing gear 47—50, with the master wheel shaft 51, the master wheel 41 and the totalizer wheels (not shown) as they successively mesh with the master wheel.

Vertically extending gear shifting arms 254, 255 fast on a gear shifter shaft 252 journaled at its opposite ends in the front and rear sides of the casing enclosing the differential mechanism, engages a grooved hub 256 of the total clearing and printing gear 258, a third or operating arm 250 (best shown in Fig. 19a) projecting horizontally from the gear shifter shaft to a point beneath the lateral finger 249 of an arm 247 journaled on the locking shaft 24.

A spring 253a attached to a fourth arm 253 fast on and depending from the gear shifter shaft 252 normally tends to rock the shifter shaft to cause the shifting arms to shift the total clearing and printing gear 253 into and out of engagement with a vertically shiftable printing and clearing rack 260 and to press the horizontally extending operating arm 250 of the shifter shaft upwardly against the lower edge of the lateral finger 249 of the loosely depending arm 247.

One side of the lower end of the depending arm 247 is recessed, as at 247a, Fig. 19a, into which recess extends a pin 247b projecting from the recessed wall to pivotally support a by-pass pawl 248 yieldingly held at the end of its counter-clockwise movement by a spring 248a, so that the forward edge of the by-pass pawl lies in the path of a shoulder 246 (dot and dash lines Fig. 19a) on a vertically extending total control slide 244 (see also Figs. 19–21). An offset cover plate 247c retains the by-pass pawl 248 in place on its pin 247b.

The foregoing mechanism is a modification of the mechanism disclosed in Anschutz, U. S. application, Serial No. 146,897, filed June 7, 1937, now Patent No. 2,347,235, issued April 25, 1944.

The vertically extending control slide 244, similar to the calculating key control slide 35, normally tends to descend due to the pull of springs 245, the lower end of the control slide 244 being provided with a roll in contact with the cam 234 of a control cam unit 233, 234, 235, loosely mounted on the drive shaft 33 adjacent a ratchet wheel 237 fast on the drive shaft.

Normally, the high point of the cam 234 is presented to the lower end of the control slide 244 to maintain the slide in its elevated position against the tension of the springs 245.

The total-taking control includes the total key 11 (Figs. 2, 19, 20 and 22) on the key lever 230 journaled intermediate its ends on the same fulcrum rod 28 as the calculating keys 10, and provided with a spring-pressed key latch 27a pivoted to the total key lever and hooked to co-act with the key lock rod 140. This total key, besides setting certain controls (not shown) relating to the totaling operation, controls the rotary clutch unit 233, 234, 235 cooperating with the means for conditioning the machine to enter factors in the multiplying mechanism 242, 243 (Fig. 23). In contradistinction to the total keys of the prior art, the rear arm of the total key lever 230 is abridged, and in place of its usual extension, an angular trip lever 224 is journaled on the fulcrum rod 28 adjacent the total key, the rear arm 231 of which angular trip lever assumes the function of the former rear extension of the total key lever, to normally retain the clutch pawl 233 of its associated rotary unit in idle position, out of engagement with the driving ratchet 237 fast on the drive shaft 33. To this end, a spring 225 tends to rock the trip lever 224 counter-clockwise (Fig. 22) to position the rear arm 231 in the path of rotation of the clutch pawl 233 slidingly mounted on the rotary cams 234, 235 journaled on the drive shaft 33 and similar to the rotary cam units 30, 31 of the respective calculating keys.

An ear 228 on the trip lever 224 contacts a depending leg 229 of the total key lever 230 to limit counter-clockwise rotation of the trip lever relatively to its total key lever.

To release the usual individual totalizer wheel locking levers (not shown), the head of the total taking control slide 244 is formed with an inclined cam shoulder 246a, which, when the slide is in its normal elevated position, lies a short distance above the free edge of the by-pass pawl 248.

At an intermediate point on the slide, a shoulder 329 supports the free end of a restoring arm 330 pivoted at 347 to a stationary bracket 349 projecting forwardly from the differential casing 9. A spring 352a connected to the restoring arm 330 holds the forward free end of the arm against an adjustable stop 331 projecting laterally from the vertically extending total and clearing rack 260 lying adjacent to and parallel with the control slide 244, and suitably guided for vertical reciprocation.

The totaling and clearing gear 258 normally lies laterally of a rack 259 formed on the upper rear edge of the total and clearing rack bar 260, in position to mesh with the rack teeth when the gear 258 is axially shifted to the right (Figs. 19 and 20), and a second series of rack teeth 366 at the lower end of the rack 260 are in constant mesh with a pinion 272 fast on a stub shaft 273 journaled in the bracket 349, by which the type bar selecting mechanism, hereinafter explained, is set.

A companion pinion 274 also fast on the stub shaft 273 is engaged by rack teeth 465 formed on the lower edge at the forward end of a sectional rearwardly extending rack bar 275 suitably guided at its opposite ends in the bracket 349 and a rear bracket 485.

A drive spring 276 connected to the connecting rack bar 275 near its rear end, tends to advance the connecting rack bar, to cause its forward rack 465 to turn its pinion 274 clockwise and with it, the stub shaft 273 and pinion 272.

Rotation of the pinion 272 under the influence of the drive spring 276, draws the vertical rack 260 downwardly to cause the rack teeth 259 at the upper end of the vertical rack to turn the total clearing and printing gear 258, when engaged with the rack teeth 259, and rotate the differential shaft 46.

The reversing gears 47—50 connecting the differential shaft 46 with the master wheel shaft 51 and master wheel 41, are set by the total key lever 230, to reversely rotate the master wheel which, in turn, reversely rotates the particular totalizer wheel at that time in mesh with the master wheel a number of steps equal to the value of the particular digit registered on the totalizer wheel.

Obviously the connecting rack bar 275 must have an extent of travel at least equal to the greatest number of steps (nine in the decimal system) through which the totalizer wheel may rotate in its return to its zero position, but since the totalizer wheels may register any other significant digit of lower value, it is customary to provide means (not shown) controlled by depression of the total key 11, to arrest the active totalizer wheel when it has been restored to zero in a total taking operation.

Reverse rotation of the differential shaft 46 will reversely rotate the differential wheel 45 and its differential rack 44 (Fig. 3) in some instances, but such reverse rotation is idle and without effect.

Means is provided, to latch the vertical totaling and clearing rack bar 260 (Fig. 19) and its operating rearwardly extending rack bar 275 in their normal positions against the influence of the drive spring 276 by latching the rack bar 260.

A latch dog 267 pivoted to a fixture 383 (Fig. 19) at 269, engages a series of downwardly inclined teeth 270 arranged longitudinally of the sliding rack member 260 and extending in a plane at right angles to the two sets of rack teeth 259 and 366. A spring 387 (Fig. 21) urges the latch dog 267 into engagement with the ratchet teeth 270.

The latch dog is disengaged from the ratchet teeth 270 by a beak 265 carried by the control slide 244 and normally overhanging the doubly-beveled nose of a trip pawl 266 mounted at 269 with the latch dog 267, said trip pawl normally resting upon a laterally turned lip 285 projecting from the latch dog.

When a total is to be taken, that is, when it is desired to automatically clear the totalizer wheels successively of an amount registered thereon and to print such amount digit by digit, the total control key 11 (Figs. 19 and 22) is depressed to rock the total key lever 230, which, by its lip 223, rocks the trip lever 224 to release the clutch pawl 233.

The clutch pawl thereupon engages the power-driven ratchet 237 to connect the control cam unit 234, 235 with the ratchet for rotation, whereupon, at the proper time, the descending periphery of the rotary cam 234 permits the control slide 244 to shift downwardly, which withdraws the shoulder 329 from beneath the rack-restoring arm 330, so that such arm can yield upon downward travel of the total and clearing rack 260.

During the descent of the control slide, the inclined shoulder 246 on the head of the slide contacts the rounded free edge of the by-pass pawl 248 (Fig. 19a) and rocks rearwardly the arm 247 depending loosely from the locking shaft 24 to effect two different results.

First, the rear face of the depending loose arm 247, as it rocks rearwardly, contacts a lateral projection 263 on an arm 264 fast on the locking shaft 24 to rock the shaft and cause its totalizer wheel release finger 39 (Fig. 12) to displace the denominational totalizer wheel lock (not shown), of that totalizer wheel then in mesh with the master wheel 41.

Secondly, the forwardly extending finger 249 (Fig. 19a) on the loose depending arm 247, presses downwardly on the horizontally extending arm 250 fast on the gear-shifting shaft 252 against the tension of the restoring spring 253a, to shift the total and clearing gear 258 (Figs. 20 and 21) into mesh with the upper set of rack teeth 259 of the sliding rack bar 260.

The control slide 244 as it continues to descend, wipes a projection 265 (Fig. 19) mounted thereon past the double-beveled free end of the trip pawl 266, rocking the pawl and the latch dog 267 clockwise (Fig. 21) against the tensions of their restoring springs 268 and 387, respectively, to disengage the latch dog from the ratchet teeth 270, and release the total and clearing rack 260 to the action of the drive spring 276 (Fig. 19) acting through the connecting rack bar 275, pinion 274, stub shaft 273 and pinion 272 in constant mesh with the total and clearing rack.

Under the influence of the drive spring 276, the totaling and clearing rack 260 is shifted vertically downwardly, the rack teeth 259 (Fig. 20) of the rack rotating the totaling and clearing gear 258 and the differential shaft 46, and through the reverse gearing 47—50 (Fig. 19) now set to "subtraction," turning the master wheel shaft 51 and master wheel 41 together with the totalizer wheel in subtractive direction until the totalizer wheel arrives at its zero position.

Total printing mechanism

Totals are automatically printed digit by digit under control of the successively engaged totalizer wheels, and the clearing means just above described.

Obviously, the totalizer wheel controls the extent of travel of the totaling and clearing rack bar 260 and the connecting rack bar 275, so that the connecting rack bar advances a distance corresponding to the value of the digit registered on the totalizer wheel.

The rear end of the connecting rack bar 275 is provided with a rack 278 in constant mesh with a pinion 279 fast near one end of a selecting or tappet shaft 217 extending transversely across the rear end of the machine frame, (Figs. 3, 11, 18, 19, 22 and 23).

A series of radiating tappets 218 common to all the totalizer wheels are spirally arranged in predetermined spaced relation around the tappet shaft 217, said circularly arranged tappets corresponding with the positions of the digits around the totalizer wheels and so positioned relatively to the numeral printing type bars 58, that when the tappet 218 corresponding to the digit "5," for example, on any totalizer wheel, is in its vertical depending position, it will coact in the selection of the "5" type bar for printing on the record sheet.

To effect the selection and operation of the type bar 58 (Figs. 2 and 3) corresponding with the adjusted tappet 218, a horizontally positioned rocking bail comprising side arms 306 (Figs. 18 and 22) of unequal length is pivoted at 307, 308, respectively, to the respective lower side rails of the body of the machine, the side arms being connected intermediate their ends and at their rear ends by bracing cross rods, one of which is indicated at 309.

A set of angular tappet levers 310 are individually journaled in spaced relation on the cross rod 309, the lower rearwardly extending arms of the angular tappet levers extending beneath the tappet shaft 217 slightly below the paths of the spirally radiating tappets 218, and the respective tappet levers being associated with their respective tappets.

Links 312 pivotally connect the upwardly extending arms of the tappet levers 310 with the depending arms of the intermediate type bar levers 57, pivoted at 57a. The upper ends of the intermediate levers are connected by the usual pin-and-slot connections with the heels of their respective type bars 58.

The forward extension 527 (Fig. 22) of the longer side arm of the tappet bail 306, 309 is provided with a connector coupling 296 slidably mounted thereon and having oppositely extending lugs 295, 298. A spring 297 normally retains the connector 296 with its lug 298 disengaged from a recess 299 formed in the upper end of a link 300 pivoted intermediate the ends of a rocking arm 303 pivotally mounted at its rear end as at 305. A spring 304 normally holds the rocking arm 303 and its link 300 at their upper limits of travel with the upturned free end 302 of the printer rocking arm 303 in contact with the periphery of the totaling and clearing cam 235 of the totaling and clearing cam unit 234, 235.

The oppositely extending lug 295 of the sliding connector is normally held by the spring 297 in contact with the forward edge of the vertical arm of a coupling control bell crank 292 having a forward arm 291 extending into the path of a pin 290 projecting laterally from the lower end of the control slide 244.

When the control slide has nearly reached its lowest position determined by its control cam 234, the pin 290 contacts the arm 291 and rocks forwardly the vertical coupling control arm 292 of the bell crank to slide the connector forwardly and position the lug 298 in the recess 299 of the link 300, thus connecting the rocking tappet bail 306, 309 with the rocking arm 303.

Immediately thereafter, the high point 328 of the printer cam 235 acting upon the upturned free end 302 of the printer arm 303, rocks the printer arm and the tappet bail clockwise to quickly raise the series of tappet levers 310 towards their tappets.

The rearwardly extending arm 311 of that tappet lever 310 corresponding with the particular tappet set to its lowest position by the return of a totalizer wheel to zero, and representing a value corresponding to the digit registered on the totalizer wheel just before the wheel was reset to zero, will be arrested early in the upward rocking of the tappet bail 306, 309.

As a result, that tappet lever 310 will rotate counter-clockwise on its fulcrum rod 309, and through the link 312, pawl 56 and intermediate lever 57, will cause the type of type bar 58 to be driven against the record sheet.

For a more detailed understanding of the foegoing mechanism, recourse may be had to my prior filed co-pending applications, Serial No. 146,897, filed June 7, 1937, now Patent No. 2,347,235, issued April 25, 1944, and Serial No. 241,672, filed November 21, 1938, now Patent No. 2,351,896, issued June 20, 1944.

The machine disclosed in these co-pending applications is provided with a horizontally disposed rocking frame for effecting automatically the letter-spacing feed of the record sheet carrier or paper carriage during total printing under control of the total printing cam 235, and for releasing the totaling and clearing gear 253 for return to its normal idle position.

The invention forming the subject of the present specification and claims utilizes this rocking frame and in so doing, adds to its functions, which warrants a brief description of this element as used in the former disclosures to facilitate an understanding of its novel features.

Referring to Figs. 2, 13, 18 and 19, the cross-braced rocking letter space control frame 197 is journaled on a fulcrum rod 196 extending transversely of the base of the machine and includes a cross rod 195 mounted at the forward end of the rocking frame, which cross rod lies in the path of the total print controlling cam 235 for operation thereby.

A collar 332 on the rocking frame cross rod 195 in the plane with the cam 235 and contacting the periphery thereof, enables the cross rod to be located sufficiently beneath the series of cams 31 or less mean diameter on the drive shaft 33 as to be normally out of the paths thereof.

The left hand end of the rocking cross rod 195 is extended through a slot 198 (Fig. 19) formed in the side rail 185 of the sub-frame 12 and a spring (not herein shown, but present in application Serial No. 146,897, now Patent No. 2,347,235, issued April 25, 1944) normally maintains the free end of the rocking frame elevated in position to be operated by the total print control cam 235.

After the high point 328 of the total print control cam 235 acts upon the upturned end 302 (Fig. 22) of the rocking printer arm 303, the cam wipes over the collar 332 on the cross rod 195 to depress the rocking frame 197, and cause the extension 194 of the cross rod to traverse the slot 198 in the side rail of the sub-frame 12.

A link 318 (Fig. 19) connected to the extended end of the cross rod 195 transmits this movement to a rearwardly extending lever 319 pivoted to the sub-frame 12 at 320. An offset lip 321 on the rear end of the lever 319 lies beneath the lower end of a vertically arranged sliding bar 323 suitably guided on the machine frame. A spring 324 normally holds the sliding bar 323 at the lower end of its movement. A slot 325 near the upper end of the sliding bar accommodates the tail 326 of the latch 261, 262 which locks the total and clearing gear 258 in its effective position engaged with the total and clearing rack teeth 259.

As indicated by a comparison of Figs. 22 and 19, the high point 328 of the total printer-cam 235 first actuates the printer arm 303 and immediately afterward, rocks downwardly the letter spacing control frame 197 with its cross rod 195, the extended end of which rod rocks the lever 319 to shift the trip slide 323 upwardly and displace the latch member 261, 262, to free the total and clearing gear 258, for return to its idle position.

Spring 253a (Fig. 19a) thereupon rocks the depending arm 253 and the horizontal arm 250 and the shaft 251 back to their normal positions, to disengage the total and clearing gear 258, axially from its rack 259, the arm 250 restoring the arm 247 loose on the locking shaft 40 (Fig. 3), which releases the arm 264 (Fig. 19a) fast on the locking shaft and said locking shaft, to return the release finger 39 (Figs. 3 and 19) to idle position and the master wheel locking pawl 24a to effective position.

The return of these parts is permitted because the low point of the total cam 234 is presented to the lower end of the control slide 244, and the springs 245 have shifted the control slide so that the dwell 246a on the head of the control slide has descended to a point beneath the free edge of the by-pass pawl 248. The total control cam unit 234 now elevates the control slide 244, the shoulder 329 of the slide operating by contact with the restoring arm 330 to return the total and clearing rack bar 260 to its normal position where it is locked by the detent 267 (Fig. 21).

The total and clearing rack 260 as it restores under the power of the cam 234, drives the pinions 272, 274 to restore the connecting rack bar 275 and tappet shaft 217 to their normal positions.

The letter spacing control rocking frame 197 returned to its normal position immediately after its depression by the printer cam 235, which enabled the spring 324 to return the vertically shiftable trip slide 323 and the latch 261, 262 to normal, so that the parts are in position for a succeeding operation.

The several mechanisms hereinbefore described, are shown in the above-mentioned earlier filed co-pending applications, except where specifically referred to as modified, and form a part of the invention now to be described only insofar as they co-operate with the novel features to present useful combinations.

For example, it is desired to maintain the machine in the performance of all of the functions controlled by the total key, when the machine is used in straight bookkeeping operations, one of such functions being the arrest of the totalizer wheels in their zero positions in a totaling operation, and another of which is the setting of the reversing or state control gearing 47—50 to subtraction.

But in this embodiment of the invention, the calculating keys are utilized in the introduction of the factors into the multiplying mechanism.

*Introducing the factors of a multiplication into a multiplying mechanism, under control of the calculating keys of a typewriting-accounting machine*

To extend the usefulness of a typewriting-accounting machine, the present invention relates to the provision of means to enable the calculating keys of such a machine to control the introduction into a multiplying mechanism of the factors of a multiplication.

To effect this result according to the present invention, the usual total taking mechanism is relied upon to effect the transfer of the factors into a multiplying mechanism under control of the calculating keys which heretofore have been prevented from exercising any control over the total printing operation.

It is, of course, highly important that the usual bookkeeping functions of the machine remain intact for use when desired.

But in the printing of totals according to the invention disclosed in U. S. patent to Anschutz, No. 2,335,251, November 30, 1943, it is necessary to depress the total key which as heretofore stated, sets the state control or reverse gearing to subtract, and positions means to arrest the totalizer wheels in their zero positions as they are reversely rotated under the subtract adjustment.

In adapting the total printing typewriting-accounting machine to the introduction of factors into a multiplying mechanism, it is desirable to avoid adjustment of the state control to subtract. Nevertheless, the total taking operation of the machine, ordinarily initiated by depression of the total key is required in the introduction of factors into the multiplying mechanism. Therefore, in the present invention, means is provided to effect total taking operations without the necessity of depressing the total key.

The calculating mechanism 9 of the typewriting-calculating machine for adding or subtracting in a totalizer 7 is not suited for calculation of the product of pre-introduced factors.

Therefore the multiplicand and multiplier are introduced into a multiplying mechanism 96 (Fig. 23) conveniently arranged at the left beside the machine frame 2 and sub-frame 12. When introducing the multiplicand and the multiplier into this multiplying mechanism by means of the calculating keys 10 of the typewriting-calculating machine, it is necessary, of course, to render inoperative the calculating mechanism 9 and to render operative the multiplying mechanism. For this reason the preparatory key 14, Fig. 1, is struck before beginning to introduce the multiplicand and also before introducing the multiplier, whereby the following mechanism is controlled.

*Arrangement of a preparatory mechanism for the multiplication*

Figure 7:
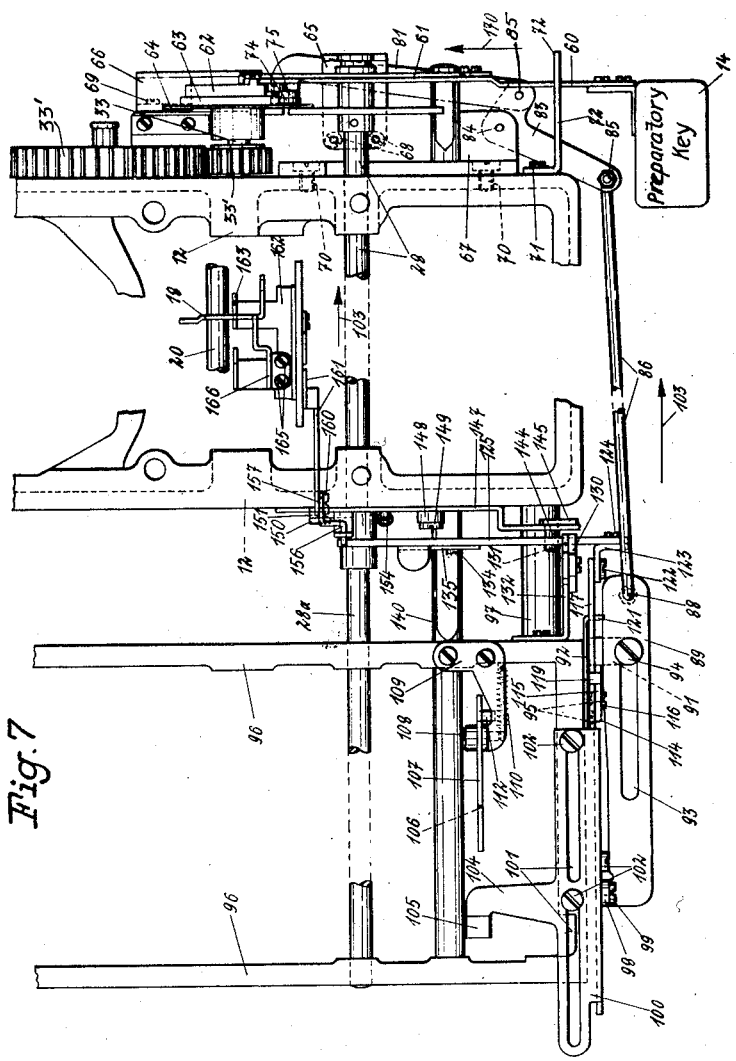
Fig. 7 is a plan view of the preparatory device in its rest position.
Figure 8:
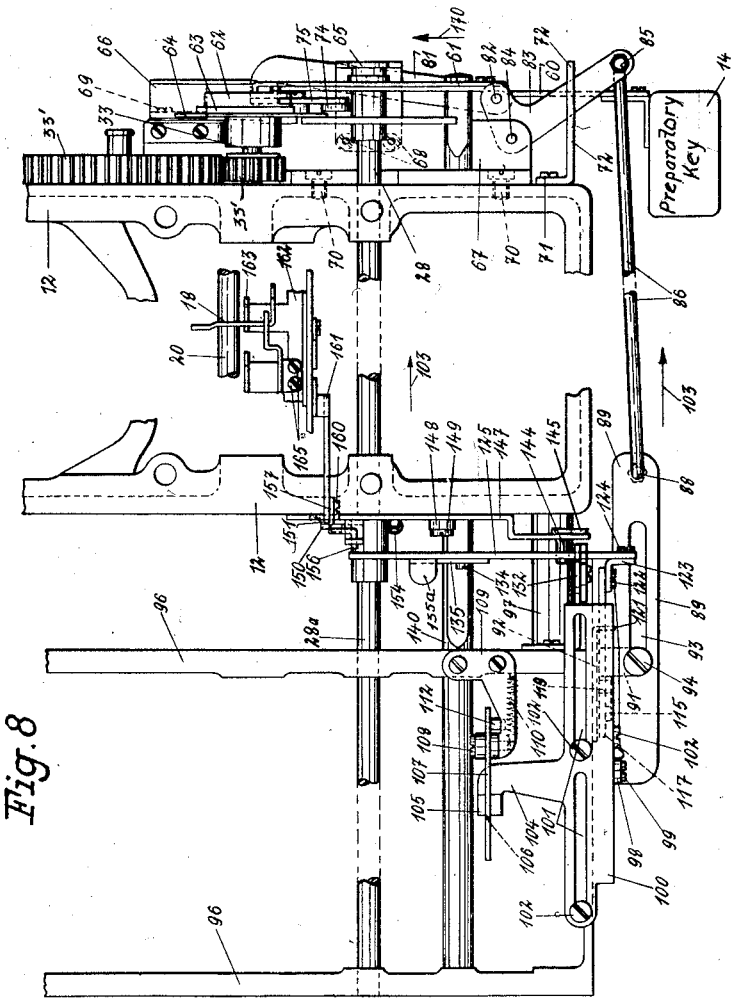
Fig. 8 is a plan view of the preparatory device in its operative position.

To enable the power drive shaft 33 to set the mechanism for conditioning the typewriting-accounting machine so that it will transfer factors digit by digit to the multiplying mechanism the right hand end of the power shaft 33 is extended through the adjacent side wall of the sub-frame 12 (see Figs. 7, 8 and 9) beyond its motor-actuated driving gear train 33', such extended end having mounted thereon a clutch cam unit similar to those controlled by the respective calculating keys 10, and comprising an eccentric disc 64 loose on the drive shaft 33 to which disc is fast a cam 63 for actuating the conditioning mechanism. A spring-pressed clutch dog 62 slidingly mounted on the cam 63, tends to engage a ratchet 62' fast on the drive shaft 33, but is normally held idle by the contact of a shoulder 62" on the clutch dog 62 with the rear end of a conditioning or preparatory key lever 60 pivoted intermediate its ends on the fulcrum rod 28 which is likewise extended to the right beyond the right hand rail of the sub-frame 12.

An angle plate 67 secured at 70 to the outer face of the right hand rail of the sub-frame 12 supports a bracket 66 fastened thereto at 69, which bracket is provided with an upwardly extending arm apertured to form a bearing rest for the outer end of the drive shaft 33, a second bracket 65 being fastened at 68 to the angle plate and having an upwardly projecting arm apertured to support the outer end of the fulcrum rod 28.

The forward arm of the conditioning key lever 60 passes through and is guided by a vertical slot 73 (Fig. 5) formed in a bracket 72 fastened to and projecting from the right hand forward corner of the sub-frame 12, the front end of the conditioning lever carrying a key top 14, and a spring-pressed key latch 61 (Fig. 9) similar to those on the several calculator keys 10, is slidingly mounted on the conditioning key lever 60, to co-act with the projecting right hand end of the grooved anchor rod 140 and retain the conditioning key lever in depressed position. The cam 63, Fig. 9, of the rotary unit 62, 63, 64 cooperates with a roller 74 on a rocker 75 pivoted on a headed screw 77 fastened in a socket 76 of the supporting angle piece 67 and constantly urged in the direction of arrow 79 by the spring 78. A link 81 jointed to the lower arm of rocker 75 at 80 connects said rocker with the shorter arm of an angle lever 83 at 82. The angle lever 83 is pivoted at 84 to the under face of the supporting angle 67. A second link 86 (Figs. 5–10) pivoted at 85 to the longer arm of the angle lever 83, extends transversely across the machine and is pivotally connected at 88 to a rectilinearly slidable bar 89, longitudinally slotted at 93 to accommodate and be guided in its horizontal movement by a headed screw 94 projecting upwardly from a lug 91 offset from a guide plate 92 secured at 95 to the front wall of a frame 96 of the multiplying mechanism to which the factors from the typewriting-accounting machine are to be transferred. The frame 96 is rigidly connected with the supporting frame 12 by the connecting bars 97, indicated, respectively, in Figs. 2 and 8.

The left hand end of the sliding bar 89 which constitutes an extension of the pivoted link 86, carries an ear 98 (Figs. 5, 6, 7, 8 and 10) secured at 99 to a similar ear depending from an angularly formed slide 100, fitted against the upper horizontal edge and the vertical front face of the front cross bar of the frame 96. Both the upper horizontal flange of the slide 100 resting on the upper edge of the frame, and the vertical flange of the slide fitting against the outer face of the front rail of the frame 96 are slotted, as at 101, to accommodate headed guide studs 102 mounted on the frame 96.

The spring 78 (Fig. 9) acts through the rocker 75, and the linkage 81, 83, 86 and 89 to thrust the slide 100 to the left (see Figs. 5, 7 and 10) so that normally, the right hand ends of the guide slots 93 and 101 contact the headed studs 94 and 102.

An arm 104 projecting rearwardly from the horizontal flange of the slide 100 is provided with an inclined lip 105 offset to the left from the arm.

A fixture 109 secured to the upper edge of the right hand rail of the frame 96 is formed with an upturned bearing to which a latch 107 is pivoted at 108, the head 106b, of the latch lying in the path of the inclined lip 105, and being beveled at 106a to facilitate the passage in one direction of the edge of the lip beneath the head of the latch. A shoulder 106 on the head of the latch is engageable by the inclined lip 105 when the slide 100 is shifted to the right.

A spring 110 connected to the latch 107 below its pivot, tends to rock the latch counter-clockwise (Figs. 5, 6 and 10) to yieldingly retain the head of the latch in the path of the lip 105 and to snap the latch shoulder 106 over the lip when the slide 100 is slid to the right. A stop 112 projecting from the latch contacts the under face of the fixture 109 (Fig. 8) to limit the counter-clockwise rocking of the latch.

Figure 5:
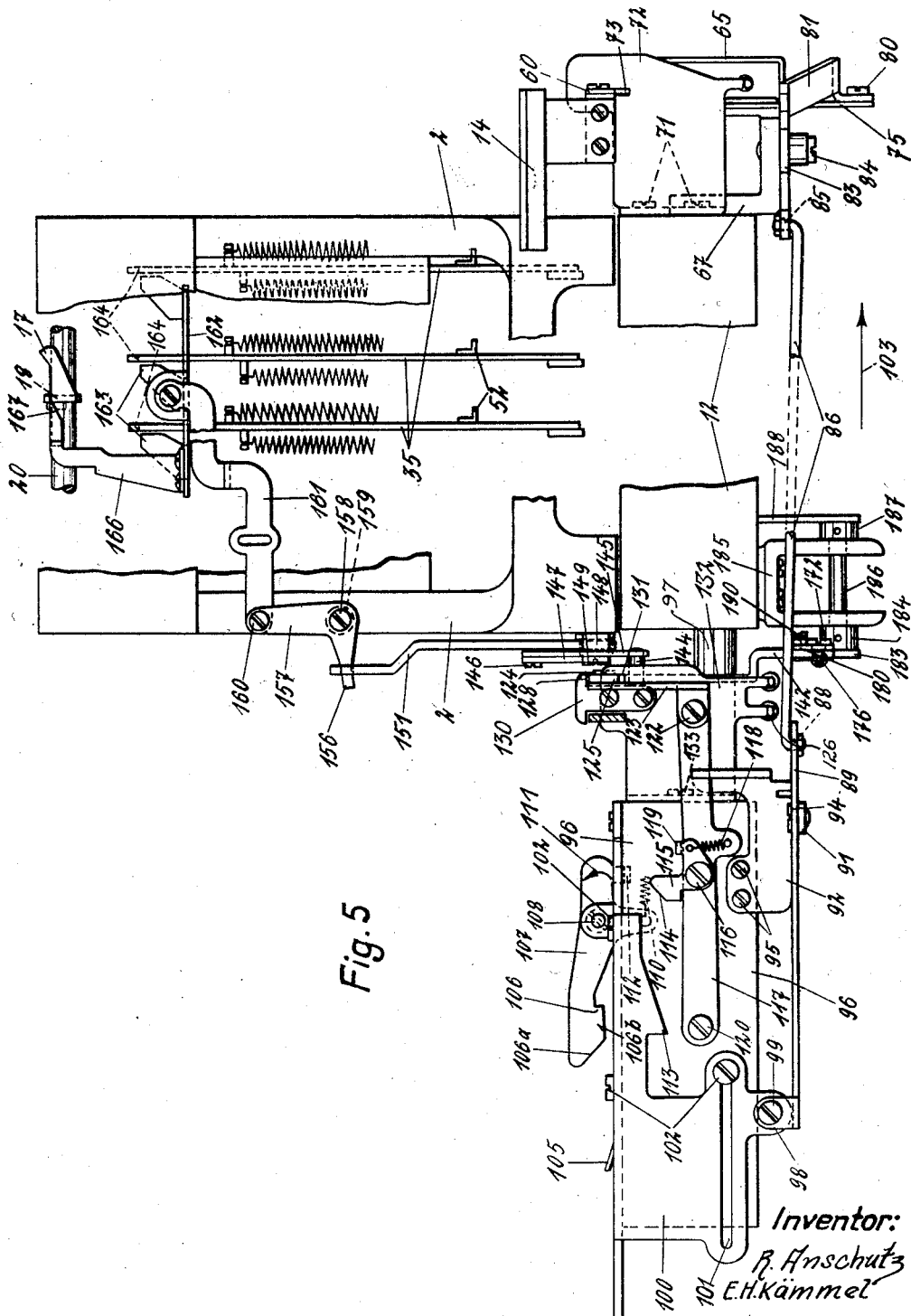
Fig. 5 is a front view of the preparatory or conditioning device for the multiplication in its rest position, some of the parts being broken away.
Figure 6:
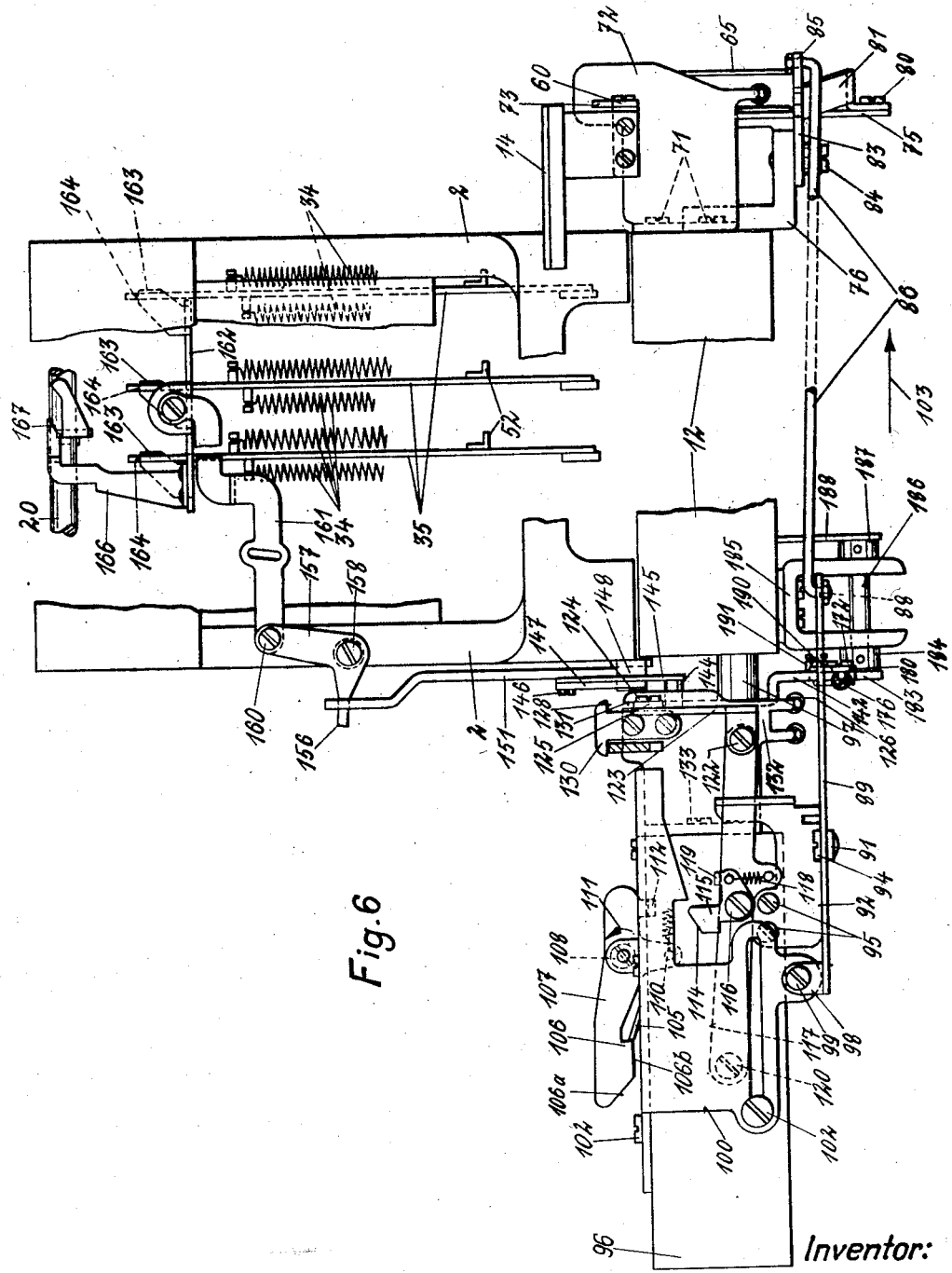
Fig. 6 is a front view similar to Fig. 5, in which the preparatory device for the multiplication is shown in operative position.
Figure 10:
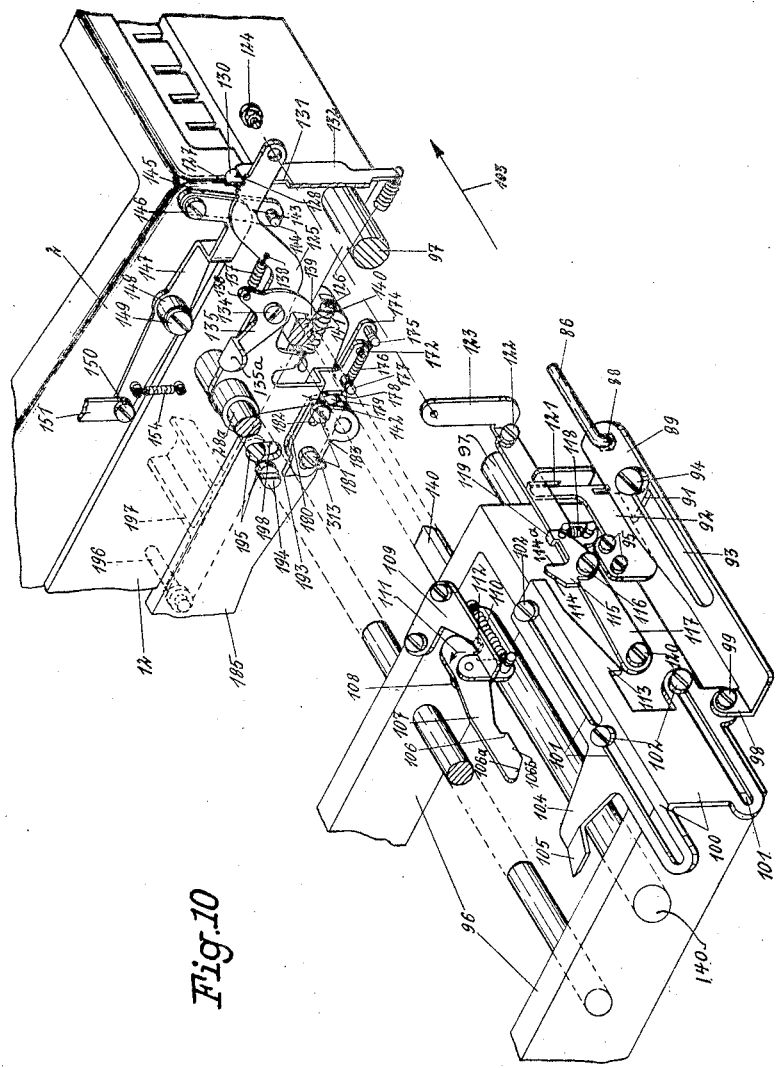
Fig. 10 is a left front perspective view of other parts of the preparatory device for the multiplication mechanism with some parts disjoined from each other.

The right hand end of the vertical flange of the slide 100 is cut away, as shown in Figs. 5, 6 and 10, to leave a depending cam 113 lying in the same vertical plane with, but separated from, a yielding tappet 115 having an inclined nose 114 and pivoted at 116 intermediate the ends of an operating lever 117 which itself is pivoted at its left hand end at 120 to the vertical face of the front rail of the frame 96. A spring 118 rocks the tappet 115 clockwise until arrested by contact of an offset lug 119 of the tappet against the upper edge of the operating lever 117.

Said operating lever extends to the right through a guide slot 121 in a laterally turned flange of the guide plate 92 and part way across the space between the multiplying mechanism frame 96 and the sub-frame 12 of the typewriting-accounting machine, the free end of the operating lever 117 being connected at 122 with the lower end of a link 123 pivoted at its upper end at 124 to the forwardly extending arm 125 of a bell crank 125, 142 journaled on an extension 28a of the fulcrum rod 28, projecting through the left hand wall of the sub-frame 12.

The depending arm 142 (Fig. 13) of the bell crank 125, 142 terminates in a foot on the inner face of which a shoe 174 is slidingly attached by studs 172 passing through slots 173 in the shoe. A spring 176 attached at one end to the toe of the shoe at 175, and at its opposite end to the foot of the bell crank arm 142 at 177, tends to project the heel 178 of the shoe rearwardly towards the forward end 179 of a tappet 180 slidingly mounted on a crank arm 183 by headed studs 181 passing through slots 182 formed in the crank arm which is fast on the left hand end of a stub shaft 186 journaled at 185a (Fig. 15) in the depending flanges of a channel bar 185 lying beneath and parallel with the left hand side of the sub-frame 12.

A trip arm 188 fast on the inner end of the stub shaft 186, extends upwardly into close proximity to the tail of the total clutch trip dog 224 associated with the total key 11, heretofore explained.

A spring 190 anchored to the bell crank arm 142 at 191 and to the sliding tappet at 189 normally holds the tappet 180 at the forward end of its travel as limited by the slots 182 and studs 181 with the forward end 179 of the tappet against the heel 178 of the shoe 174, and its rear end out of the path of travel of the extended end of the cross rod 195 of the rocking escapement control frame 197, heretofore described.

The spring 190 also holds the stub shaft 186 and its trip arm 188 at the limit of their clockwise movement, as determined by the contact of the crank arm 183 against a fixed stop 192.

A spring 126 connected to the bell crank 125, 142 and to a tooth of a comb plate 132 fixed to and projecting to the right from the right hand rail of the frame 96, normally holds the bell crank at its counter-clockwise limit of travel as determined by contact of the upper edge 127 of the bell crank arm 125 with a shoulder 128 (Figs. 5 and 6) formed by a T-shaped guide plate 130 fastened to the comb plate 132.

Figure 13:
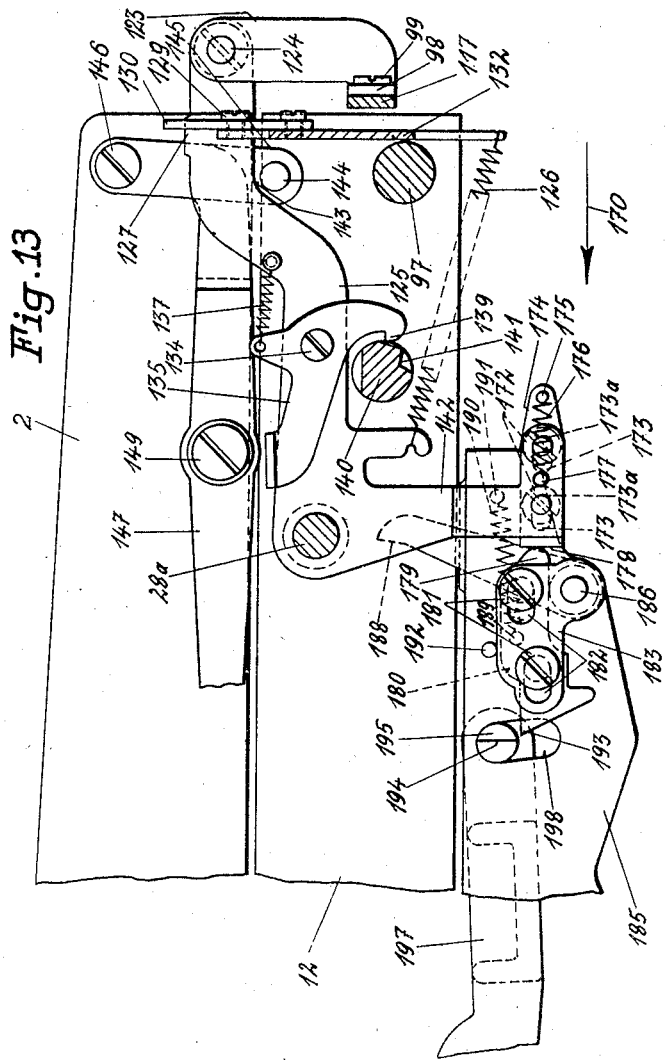
Fig. 13 is a left side view of some of the control parts for the preparatory mechanism in their rest positions.

Due to the spring 126 acting normally to retract the bell crank 125, 142, Fig. 13, counter-clockwise which tensions the spring link 190 connecting the depending leg 142 of the bell crank with the sliding tappet 180 to hold the tappet studs 181 in contact with the right hand ends of the slots 182 of the crank arm 183, the trip arm 188 fast on the same shaft 186 with the crank arm 183 is held in its idle position relatively to the total key clutch arresting and tripping dog 224 (Fig. 16).

The tension on the spring link 190 is sufficient to retain the crank arm 183 at the clockwise end of its travel with a force sufficient to overcome the tension of the spring 176 connected to the shoe 174 to hold the shoe at the right hand end of its movement. In order to retain the bell crank lever 125, 142 in its extreme clockwise position, when rocked, a catch 135 is mounted to swing on a pivot 134 on the lever 125, Fig. 10. One end of a tension spring 137 is fastened at 136 to the catch 135, while its other end is attached at 138 to the lever 125. The catch 135 is urged clockwise by spring 137 and its normal position is fixed by the tooth 139 striking against the leftward extension of the key retaining or anchor bar 140, which projects through the left side rail of the sub-frame 12 as well as through the frame 96. The tooth 139 of the catch 135 is able at the proper moment to engage in the groove 141 of the key retaining bar 140.

*Blocking operation of calculating slides*

The operating bell crank 125, 142 when rocked clockwise in conditioning the machine for the entry of the factors of a multiplication problem into the multiplying mechanism, blocks the operation of all of the calculating key controlled differential slides 35 (Figs. 3, 5, 6 and 12) against operation.

It will be recalled that the introduction of the factors digit by digit into the multiplying mechanism is accomplished by the total taking control mechanism operating under control of the calculating keys 10.

Figure 12:
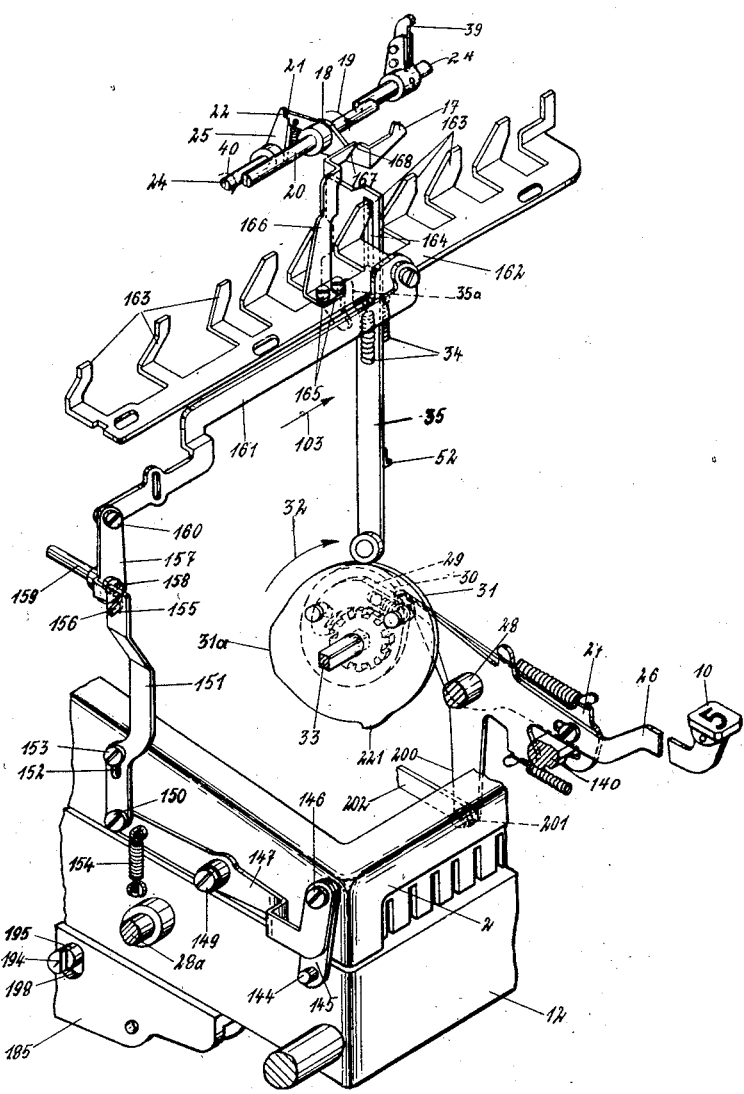
Fig. 12 is a left front perspective view of one of the calculating-units as well as the locking device for the actuating slides and some control parts for the locking device.

Since the calculating keys 10, upon depression, trip their respective calculating clutch units 29, 30, 31 (Fig. 12) for operation, and the cams 31 of such clutch units release their respective differential control slides 35 for operation to variously advance the totalizer wheels (Fig. 3), and since the total taking control slide 244 (Figs. 2, 20 and 21) and its rack bar 260 also operate the totalizer wheels through the total taking control gear 258, it may be desirable in the latter case, to temporarily disable the calculating key differential slides 35, to which end, the head of each differential slide is longitudinally slotted, as at 164, Fig. 12 to accommodate its appropriate laterally inclined tongue 163 of a series of such tongues struck up and offset from a horizontal supporting plate 162 slidable upon and supported by the calculating frame 9 (Fig. 3). The differential segments 44 and calculating slides 35 project upwardly in the spaces between adjacent tongues.

A link 161 (Fig. 12) pivotally connected to the tongue plate 162 extends to the left side of the machine, where it is pivotally connected at 160 to the upper arm of a lever 158 journaled on a stud 159 in the frame. The remaining reversely bent arm of the lever 158 is reduced to form a pin 156 (Figs. 5 and 12) entered in a slot 155 at the upper end of a depending link 151 guided by a slot and pin connection 152, 153 with the side rail of the machine frame 2. The lower end of the depending link 151 is pivoted at 150 to the rear arm of a lever 147, the hub 148 of which rocks on the supporting stud 149. This lever extends forwardly longside the left hand rail of the machine frame to a point adjacent the forwardly extending arm of the operating bell crank 125, 142, a link 145 depending from the forward arm of lever 147 at 146 and having a stud 144 projecting outwardly directly beneath and in the path of the forward arm of the operating bell crank 125, 142, as shown in Fig. 10. A spring 154 connected to the rear arm of the lever 147 normally operates through the recited linkage to draw the tongue plate 162 to its extreme left hand position wherein the tongues 163 lie out of engagement with the slots 164 in the several calculating control slides 35.

When the operating bell crank 125, 142 is rocked by the preparatory clutch cam unit 233, 234, 235, and connecting linkage, the forward arm of the operating bell crank contacts stud 144 to draw downwardly the link 145, rocking the lever 147 (Fig. 12) against the tension of its spring 154 and through the linkage 151, 157, 161, slides the tongue plate 162 to the right to enter the tongues 163 in the slots 164 of the respective calculating control slides 35 to prevent the latter from shifting downwardly upon the rotation of their associated clutch cam units 29, 30, 31.

Return of the operating bell crank 125, 142 releases the projecting pin 144 and the thereto-connected train of linkage and enables the spring 164 to restore the linkage and tongue plate 162 to their normal idle positions.

An upwardly projecting fixture 166 fastened at 165 to the tongue plate 162 is provided with a laterally offset cam projection 167 to contact with and disable the usual spring-pressed locking dog 18 which prevents operation of the accounting mechanism of the machine in the absence of a column totalizer at the calculating zone. The cam projection 167 engages and disengages from the locking dog 18 as the tongue plate is shifted to the right and back to normal position, respectively, such cam 167 lying out of the path of travel of the usual lock releasing blades depending from the column totalizers and dummy totalizers.

*Operation of the preparatory mechanism for the multiplication*

Figure 9:
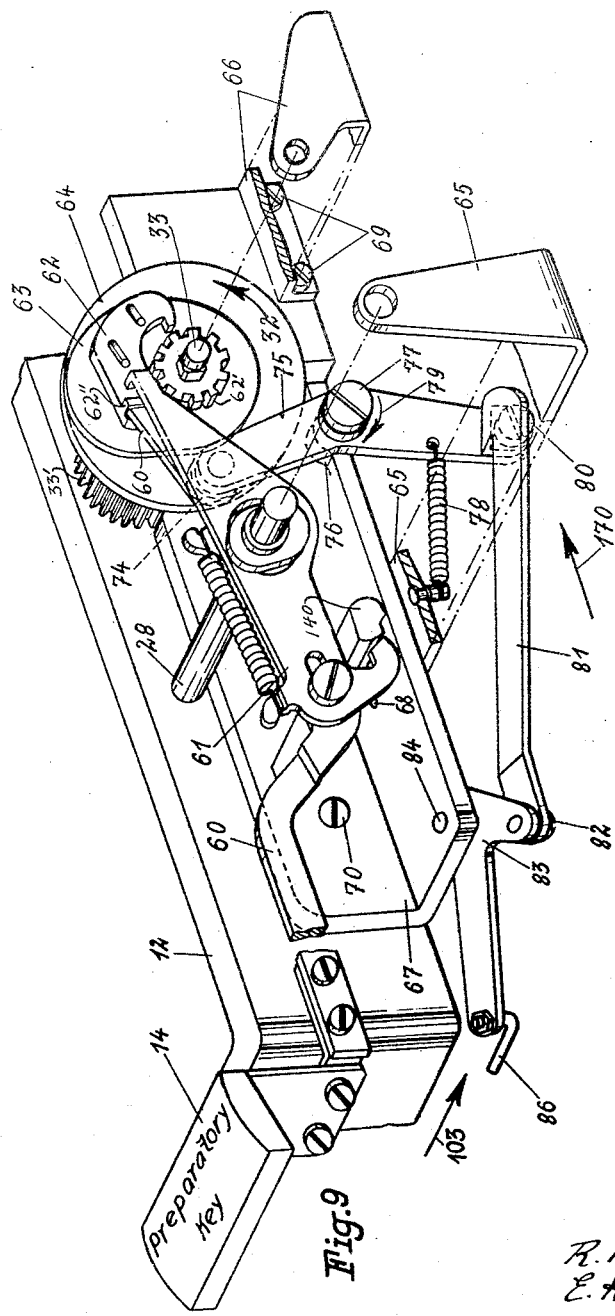
Fig. 9 is a right front perspective view of the preparatory key and the parts controlled thereby.

One method of operation is explained as follows: prior to entering the multiplicand into the machine by depression of the calculating keys of corresponding values, the paper carriage 5, Fig. 1, which is assumed to be in its extreme right hand position, is tabulated leftward to locate that column totalizer into which the multiplicand is to be entered, with its denominational totalizer wheel corresponding with the highest significant digit of the multiplicand in mesh with the master wheel 41, Fig. 19. If, however, the entry of the multiplicand or the multiplier in the column totalizers is not required, the latter are replaced by dummy totalizers on the totalizer suspension rail 6. Then the preparatory key 14 is depressed, whereby the key lever 60 and the spring-pressed key latch 61, Fig. 9, are moved anti-clockwise around the shaft 28. Consequently the rotary unit 62, 63, 64 is connected in known manner for rotation by the driving shaft 33 which turns in the direction of arrow 32. During the first half-turn of the preparatory clutch 62, 63, 64 the rising periphery of the cam 63 engages the roller 74 and rocks the lever 75 in the reverse direction of arrow 79 and against the action of the spring 78. In this way the link 81 is moved in the direction of arrow 170, Figs. 7 to 9, and the angle lever 83 is moved anticlockwise around the pivot 84 from the position illustrated in Fig. 7 into the position illustrated in Fig. 8. Simultaneously the angle lever 83 pulls the link 86 in the direction of arrow 103 together with the sliding bar 89 and slide 100. During this sliding movement of the slide 100 the cam 113 cooperates with the incline 114 of the tappet pawl 115, Figs. 5, 6, and 10, and through the laterally extending lug or driving connection 119 moves the lever 117 clockwise around the pivot 120 to draw the vertical link 123 downwards and the latter, owing to the connection 124, moves the bell crank lever 125 clockwise around the fulcrum rod extension 28a against the tension of the spring 126.

When the slide 100, in its travel towards the right under the influence of the clutch cam 63, Figs. 9 and 10, reaches that position at which the highest part of the cam 113 is in contact with the highest point of the yielding tappet 115, the clockwise movement of the intermediate lever 117, and bell crank 125, 142 has been completed. At this moment, by the action of the tension spring 137, Fig. 10, fastened to the lever 125 and to the catch 135, the tooth 139 of the catch 135 on the lever 125 engages the locking notch 141 of the key retaining bar 140 to hold the lever 125 as well as the parts controlled thereby, in their operated positions, as illustrated in Fig. 6.

When the slide 100 is moved farther towards the right its inclined lip 105 of the rearwardly extending arm 104 also engages the bevel edge 106a, Fig. 10, of the head 106 of the catch 107, whereby the latter is moved against the action of its spring 110 in a direction opposite to the arrow 111 and is held in this position until the lip 105 in its continued travel to the right with the slide 100, escapes past the dwell 106b of the lip 106 of the catch 107 whereupon the catch 107, owing to the tension of the spring 110, snaps back into its normal position according to Fig. 10 to interpose its shoulder in the return path of the lip 105 of the slide 100 to retain the slide 100 and the thereto connected linkage, including the cam-operated rocker 75, in their operated positions. At this moment the highest point of the cam 63, Fig. 9, of the preparatory clutch 62, 63, 64 has been moved to contact the roller 74, at which time, the rocker or lever 75 as well as the linkage 81, 83, 86, 89 and the slide 100 connected with it, have completed their prescribed movement and are held in operated position owing to the above mentioned latch mechanism 106, 105, Figs. 6 and 8.

The rotary unit 62, 63, 64 now completes its revolution without engaging any other members. After completion of the full revolution, the preparatory key lever 60 and its latch 61 return to their normal positions in known manner and the rotary units 62, 63, 64 is released from the driving shaft 33.

The operating bell crank 125, 142, when rocked clockwise (Figs. 13 and 14) against the tension of its return spring 126, by the cam 63, rocker 75 and linkage connecting the rocker and the operating bell crank, will press the heel 178 of its shoe 174 against the forward end 179 of the sliding tappet 180 to project the nose of the tappet rearwardly into the path of travel of the extended end of the cross rod 195 mounted in the oscillatory escapement control frame 197.

The bell crank latch 135 rocks with the operating bell crank 125, 142, to engage its tooth 139 with the flute or groove 141 in the key retaining bar 140 to retain the bell crank and the sliding tappet 180 in their operated positions through as many machine cycles as are necessary to introduce the factors digit by digit into the multiplying mechanism.

Conveniently, the extended end of the cross rod 195 of the rocking escapement control frame is slabbed or cut-away semi-circularly as at 194 to clear the nose of the sliding tappet 180 when the latter is in its normal retracted position.

After the typewriting-calculating machine has been prepared for multiplication in the hitherto described manner, the multiplicand which for example, may have "5" as its highest denominational digit, is now introduced. For this purpose the calculating key 10 which corresponds to the figure "5" is struck and the following operations ensue:

*Mechanism for introducing the values*

A downwardly projecting arm 200, Figs. 3 and 18, is provided on each of the calculating key levers 26. Rearwardly extending links 202 pivoted at 201 to their respective arms 200 are guided at their rear ends by closed slots 204 in a comb plate 205. Tensioned springs 207 connected to a rod 208 supported by the comb plate and at 206 to the respective links 202 tend to rock their links clockwise until the links are arrested by the upper end walls of the slots 204.

A cam slot 209 is provided in the rearward end of each link 202 to accommodate a headed rivet 210 of a stop member 211 mounted to slide vertically in the guide slots 212 and 213 of a U- shaped guide member 214 supporting the comb plate 205 and secured to the cross member 215 of the subframe 12.

These stop members 211 are arranged in the same vertical planes with the respective spirally arranged tappets 218 on the selecting shaft 217 of the total taking control mechanism, so that, when projected, the stops will arrest the respective tappets in their vertically depending positions when the factors of a problem in multiplication are to be introduced into the multiplying mechanism.

The provision of these stop members 211 is desirable under the above conditions since the total key 11 and its lever 230 are not actuated when introducing the factors into the multiplying mechanism. Consequently, the zero arresting blade controlled by the total key lever shown in Fig. 19 of the U. S. application of Anschutz, Serial No. 146,897, filed June 7, 1937 (now Patent No. 2,347,235, issued April 25, 1944), remains ineffective.

Therefore, each stop member 211 serves to arrest the type bar selecting shaft 217 and its tappets 218 as the shaft completes a partial rotation of an extent corresponding to the value of the key depressed.

Introduction of values

Figure 4:
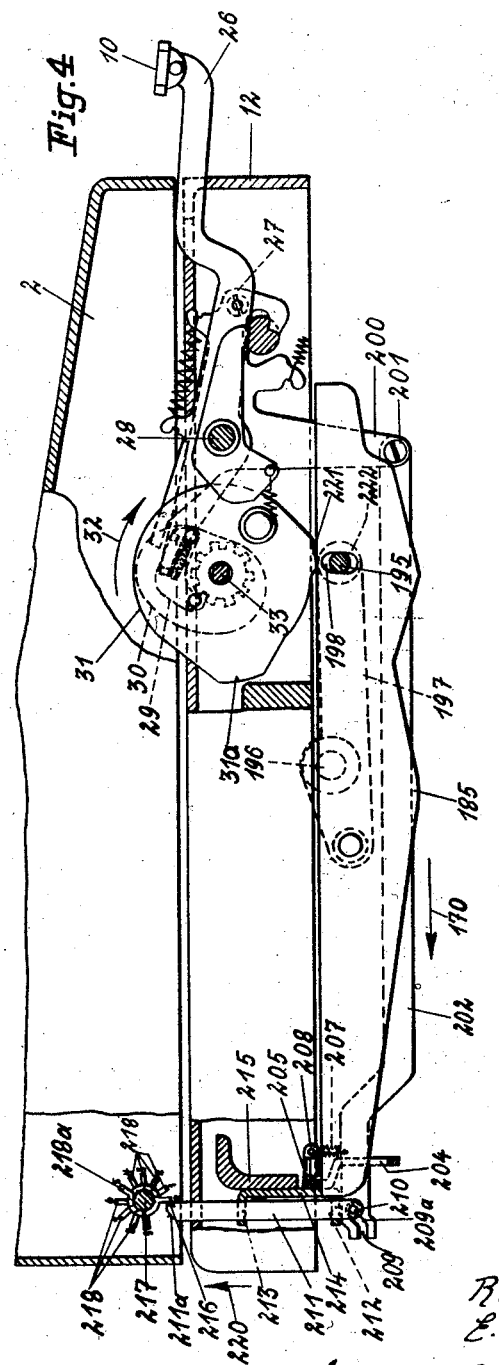
Fig. 4 shows a portion of Fig. 3, some of the parts being illustrated in operating position.

When the calculating key 10 for the digit "5" is depressed, its key lever 26 and the catch 27 are moved clockwise around the supporting fulcrum rod 28, Fig. 4, the depending leg 200 of the key lever operating to shift the link 202 corresponding to the digit "5" rearwardly in the direction of the arrow 170. The incline 209a of the curved slot 209 of the link 202, as the latter is shifted rearwardly, acts on the stud 210 to project the corresponding stop member 211 in the direction of arrow 220 to locate the tip 216 of the stop member 211 for the digiit "5" five steps or increments into the path of the tappet 218a of the selecting shaft 217 corresponding to the digit "5."

Depression of the calculating key 10 to position its stop 211 in the path of the corresponding tappet 218 on the type bar selecting shaft 217, also trips the associated calculating clutch unit 29, 30, 31, the pawl 29 of which engages is drive ratchet on shaft 33 to impart a single complete rotation to the calculating cam 30 and the printer cam 31.

Normally, the corresponding calculating control slide 35 would descend as the cam 30 rotates, but as hereinafter explained, the slide 35 is locked against descent in a factor-transferring operation.

The printer cams 31, as usual each have a maximum diameter somewhat less than the maximum diameter of the total taking control printer cam 235, but unlike the former printer cams 31, the present cams are each provided with a node 221 (Figs. 12 and 18), adapted to wipe over a collar 222 arranged on the cross rod 195 of the rocking escapement control frame 197, the collars 22 being arranged in the same vertical planes with their respective cams 31.

The nodes 221 on the cams 31 are not as high as the node 328 (Fig. 18) of the total control cam unit.

Hence, very shortly after the particular calculating key cam unit starts to rotate, its node 221 wipes past its collar 22 on the cross rod 195 of the escapement frame 197 and rocks the rod and its frame slightly downward in a clockwise direction.

This slight movement of the escapement control frame 197 is not sufficient to trip the usual carriage escapement mechanism or cause the lever 319 to effectively actuate the trip rod 323 (Fig. 19), but is of sufficient extent to cause the left hand extended end of the cross rod to contact the sliding tappet 180 projected into its path, and rock said tappet together with the crank arm 183 and trip arm 188 from the positions shown in Figs. 13 and 14, to the positions shown in Fig. 16. This causes the trip arm 188 to contact the pin 223 on the clutch dog 224 and displace the clutch dog, thereby releasing the total control cam unit 233, 234, 235 for operation, without having to rock the total key lever 230.

The total control cam unit 233, 235 now clutched to the drive shaft 33 upon release of the clutch dog 224, makes one complete rotation and is then disengaged by the clutch dog in a manner soon explained.

The total taking control slide 244 is permitted to descend as the total taking control cam 234 rotates, just as in a total taking operation, and in so doing, the cam edge 246 (Figs. 19a and 20) on the head of the total taking control slide operates on the free edge of the pawl 248 to rock the locking shaft 40 to free the active totalizer wheel and the master wheel for operation. The pawl 248 also shifts the total control differential gear 258 (Fig. 20) into engagement with the upper rack 259 of the rack bar 260, incidentally connecting said gear 258 with the differential shaft 46, all as heretofore explained in connection with the total taking mechanism.

Since, in a factor-entering operation, the total key lever 11 is not rocked, the zero arresting blade (not shown) has not been projected to position to arrest the totalizer wheel then in mesh with the master wheel, nor has the state control gearing 47—50 (Fig. 19) been shifted from addition to subtraction position.

Consequently, as the total taking control slide 244 continues its descent, displacing the total control rack restoring lever 330 (Fig. 20), the tension of the drive spring 276 (Fig. 2) urges forwardly the rack bar 275 connecting the total control rack 260 with the type bar selecting shaft 217 through the shaft and pinion train 272, 273, 274 (Fig. 21) to draw downwardly the total taking rack 260 and simultaneously rotate the type bar selecting shaft 217 and its tappets 218, until the appropriate tappet collides with the stop 211 of the depressed calculating key 10, to arrest the selecting shaft 217 after it has turned a number of steps equal to the value of the depressed calculating key.

The left hand end of the selecting shaft 217 projects through the adjacent side rail of the subframe 12, the pinion 279 (Figs. 11 and 19) being fastened to the protruding end of the shaft, and adjacent said pinion is mounted the clutch member 239 normally disengaged from a co-acting clutch member 240 axially shiftable upon the factor-entering shaft 238 (Fig. 23) journaled in the side rails of the multiplying mechanism frame 96.

The factor-entering shaft 238 lies parallel with two series of wheels 242, 243 individually journaled on a shaft 238′, and successively engageable by a factor-entering master wheel 241 axially slidable along the factor-entering shaft 238.

The clutch members 239, 240 are engageable and disengageable by any suitable means, not shown.

Therefore, as the tappet shaft 217 rotates until the tappet 218 corresponding with the particular depressed calculating key 10 collides with the stop member 211 projected by such depressed key into its path, the clutch members 240, 239, when engaged, transmit a rotation of like extent to the factor-entering shaft 239 and its master wheel 241.

Means, also not shown, shifts the factor-entering master wheel 241 step by step coincident with the successive escapement steps of the paper carriage 5 (Fig. 1) to enter all the digits of the factors in their respective and proper denominational wheels 242, 243.

Returning to the general operation of the machine, the node 221 (Figs. 3 and 18) on the cam 31 of the calculating control cam unit 29, 30, 31 associated with the depressed key, has but a momentary effect on the rocking escapement frame, the node quickly escaping from the collar 222 on the escapement control frame, whereupon the latter with its cross rod 195 returns to normal under the influence of a spring (not shown), the extended left hand end of the cross rod releasing the sliding tappet 180, crank arm 183, stub shaft 186 and trip arm 188 for return to normal by the tensioned spring link 190, assisted by the spring 225 which, in returning the clutch dog 224 to position to disengage the total taking control cam unit 233, 234, 235, at the end of a single rotation, presses the pin 223 on the tail of the clutch dog against the trip arm 188.

In this connection, it may be stated that the operating bell crank 125, 142, being arrested in its operated position by contact of its forwardly extending arm with the shoulder 128 (Fig. 5) of the T-shaped stop plate 130, cannot follow the crank arm 183 when the latter is rocked by contact of the extended end of cross rod 195 with the projected sliding tappet 180, and hence, the crank arm 183 rocks counterclockwise away from the depending arm 142 of the operating bell crank and tensions the spring link connection 190. However, the spring 176 projects the shoe 174 rearwardly against the forward end of the tappet 180 as the crank arm 183 rocks away from the bell crank, to maintain the tappet in projected position, the sliding tappet restoring the shoe to its normal position on the foot of the bell crank under the combined influence of the springs 190 and 225 as the crank arm is returned to normal.

The total taking rack 260 (Fig. 20), in its downward movement under the influence of the drive spring 276 and connecting rack bar 275, rotates the total taking gear 258 which has been shifted into clutching relation with the differential shaft 45, as the gear was engaged with the teeth 259 of total taking rack bar 260.

The differential shaft 46 transmits its movement through the reverse or state control gearing 47—50 (Fig. 19) which stands in its additive adjustment, to the master wheel shaft 51 and master wheel 41, whereby to enter a digit into the active totalizer wheel engaged with the master wheel, corresponding to the value of the depressed calculating key.

The total taking gear 258 (Fig. 19) is held in clutch connection by the engagement of the spring-pressed latch 261 with the depending arm 253 of the gear-shifting unit.

The total taking control slide 244 (Figs. 19 and 21) during its continued descent, enables its projecting lugs 265 to escape past the end of the trip dog 266, thus releasing the locking pawl 267 for engagement with the ratchet 270 of the total taking control rack 260 to lock the latter against farther descent under the influence of the spring-driven connecting rack 275, and shortly thereafter, the dwell 246 on the head of the descending total taking control slide 244 escapes past the by-pass pawl 248, and releases the loose arm 247, with its finger 249 and the arm 264 fast on the locking shaft 24, to enable the return to effective position of the totalizer wheel lock (not shown) controlled by the finger 39 on the locking shaft, and the master wheel locking dog 24a, which effectively block further rotation of the differential shaft 46.

*Printing of the factor digits*

After the multiplicand value "5" has been formed in the above described manner and has been accumulated in the column-totalizer as well as introduced into the multiplicand mechanism 242 of the multiplication mechanism of the typewriting-calculating machine, the multiplicand value "5" is printed on the paper on the platen.

During the further turning of the rotary unit 29, 30, 31 for the digit "5" as well as of the rotary unit 233, 234, 235 in the direction of arrow 32 and during the consequent farther descent of the total taking control slide 244, the pin 290 engages the arm 291 (Figs. 2 and 22) of the lever 292 to effect the coupling of the rocking frame 306, 309 with the printing lever 303 operated by the total printing cam 235 as heretofore explained.

Thereafter the high point 328 of the total printing cam rocks the frame 306, 309 carrying the series of angle levers 310 (Fig. 18), to contact that angle lever connected with the type bar 58 corresponding with the value of the depressed calculating key 10, with the tappet 218 positioned under control of the same depressed key and its stop 211, to cause the printing of the digit of the factor on the sheet on the platen of the paper carriage 5. The carriage is shifted in a letter-feed step as usual as soon as the type lever 58 falls back into place and simultaneously the factor master-wheel 241 (Fig. 23) is shifted one decimal place farther towards the right on the shaft 238 by means not shown, so that it will mesh with the next wheel of the multiplicand mechanism 242.

The paper carriage is aided in its letter-feed movement by a rocking escapement control frame 197 (Figs. 13, 18 and 19) of Patent 2,141,158. Subsequently to the operation of the printing control rocking frame 306, 309, the high point 328 of the total printing cam 235 wipes over the roll 332 on the cross rod 195 of the rocking escapement control frame 197, such printer cam 235 being of such height as to impart a full stroke or depression to the escapement frame, causing the left hand extension of the cross rod 195 to descend to the bottom of the slot 198 in the supporting rail 185.

It should be noticed that now the clutch 239, 240 (Fig. 23) located between the shaft 217 and the shaft 238 is suitably reopened in dependence on the turning of the control clutch 233, 234, 235.

During the first part of the full movement of the escapement frame 197, its cross rod 195 with its lug 194 engages the rear end 193 of the sliding tappet 180 and idly rocks the crank arm 183, trip arm 188 and clutch arresting dog 224.

The cross rod 195 during its continued rocking of the tappet slide 180 and crank arm 183, causes the inclined rear edge 313 of the sliding tappet to wipe past the rounded front edge 314 of an offset lip 315 carried by a bracket member 317 fastened at 316 to the supporting member 185 by screws 316 to cam the sliding tappet 180 (Fig. 17) and the abutted shoe 174 forwardly against the tension of the spring 176 oppositely to the direction of arrow 170 to disengage the rear end 193 of the sliding tappet 180 from beneath the projected end of the cross rod 195. When the sliding tappet clears the cross rod, the spring 190 aided by spring 225 rocks the clutch disabling dog 224, the trip arm 188 and the crank arm 183 back to their normal positions, shown in Fig. 17, in which the upper edge of the crank arm 183 again lies close against the stop pin 192. As soon as the bevelled edge 313 of the sliding tappet 180 leaves the front edge 314 of the abutment member 317, the sliding tappet and its abutting shoe 174 are again moved in the direction of arrow 170 by the spring 176 until the rear end 193 of the tappet 180 bears against the front edge 194a of the lug 194 of the cross rod 195.

*Restoring the various devices to their initial position*

The cross rod 195, as it starts to rock downwardly, draws with it the link 318 (Figs. 2 and 19) on its left hand extension to rock the lever 319 and its lug 321 against the lower end of the vertical trip slide 320, moving the latter upwards against the spring 324. Thereby the catch 261 is moved clockwise against the tension of the spring 327 owing to the driving connection 325, 326 and the obstructing tooth 262 releases the arm 258 so that the latter as well as the total taking gear shifting members 250, 252, 254, 255 connected therewith return into their initial position, owing to the tension of the spring 253a, and shift the gear 258 out of mesh with slide 259, 260.

The high point 328 (Fig. 22) of the cam 235 of the total taking control clutch 233, 234, 235 now releases the arm 302 of lever 303, whereupon the lever 303 and the coupling hook 300, as well as the type bar selecting frame 308, 309, 310 swing back into their initial positions.

The rise of the cam 234 of the rotary unit 233, 234, 235 simultaneously bears upon the total taking control slide 246 and moves it upwards together with the total taking rack bar 260, the teeth 270 of the ratchet (Fig. 21) of which rack bar pass by the pawl 267. In consequence of this upward movement of the total taking control slide 246, its pin 290 releases the arm 291 (Fig. 22) of the lever 292, allowing the latter together with the coupling slide 296 to be restored to their positions of rest by the action of the spring 297.

The total taking rack bar 260, on its return to normal position by the total taking control slide 246, through contact of the shoulder 329, Figs. 19 and 20, with the restoring arm 330, operates to restore the connecting rack 275 and the selecting shaft 217 with its tappets 218 to normal and tensions the drive spring 276. The shaft 239 (Fig. 23) of the multiplying mechanism is not moved in any way since the clutch 239, 240 is opened in any suitable manner between the two shafts 217 and 239.

At the upward movement of the cross rod 195 of the rocking escapement control frame 197 the linkage 318, 319 (Fig. 19) releases the trip slide 320 and the catch 261 which are returned to their normal positions by the springs 324 and 327. Meanwhile the rotary unit 29, 30, 31 associated with the depressed key 10 has completed a full turn so that it is disconnected from the driving shaft 33 and the key lever 26 and its latch 27 return from the depressed position as shown in Fig. 4 into the position of rest as shown in Fig. 3. Simultaneously the key link 202 and key controlled stop 211 are returned into their normal position.

Shortly thereafter the rotary unit 233, 234, 235 also completes a full turn during which the clutch pawl 233, Fig. 18, is disengaged from the clutch gear 237 by contact of the lug 232 against the arm 231 of the clutch disengaging dog 224 against the action of the pressure spring 236, so that this rotary unit 233, 234, 235 is brought to a standstill.

Now the remaining values of the multiplicand are introduced by depressing the respective calculating keys 10. The above described operations are repeated in this transaction during which, as will be understood, the respective differential means (Fig. 19) must be moved through a distance corresponding to the introduced value. When striking the calculating key 10 corresponding to zero, however, these differential means remain in their positions of rest.

The following should be noted: if in that moment in which the depressed calculating key lever 26 corresponding to the figure "5" is returned into rest position (Fig. 3) another calculating key is depressed, say for instance, the calculating key 10 corresponding to the digit "1," the tappet stop 211 corresponding to the digit "1" is raised in the direction of arrow 220 by the link 202 (Fig. 18) before the selecting shaft 217 with the tappets 218 during its return movement anti-clockwise has reached its position of rest, and before the total taking control rotary unit 233, 234, 235 has been arrested. During this anti-clockwise rotation of the shaft 217, the tappet 218 corresponding to the digit "1" in this case bears upon the rear beveled edge 211a of the raised tappet stop 211 for the digit "1" and moves it downwardly in the opposite direction of arrow 220.

Owing to the pin and slot connection 210, 209, the key link 202 is thereby moved somewhat anti-clockwise around the pivotal connection 201 with the key lever 200, 26, against the tension of the spring 207 so that the key link 202 slides downwards in its slot 208 of the guide plate 205, Fig. 3. As the selecting shaft 217 continues to be turned anti-clockwise, the tappet 218 corresponding to the digit "1" wipes over the pointed end of the stop 211, whereupon the members 211 and 202 return instantly into their proper positions under the influence of the spring 207, as shown in Fig. 4. It may be further mentioned, that when the total taking single calculating keys 10 are struck in rapid succession, the rotary unit 233, 234, 235 (Fig. 18) may not become disconnected from the driving shaft 33 for the reason that restoration of the pawl 224 which ordinarily arrests the rotary unit 233, 234, 235 may be negatived if operation of a key 10 intervenes so that its rotary unit 29, 30, 31 has moved the escapement control frame and its connected members 221, 222, 195, 194, 193, 160, 183, 188, 180 to put the pawl 224 into the position shown in Fig. 16, at about the time when the rotary unit 233, 234, 235 completes a cycle for the previously operated key. For this reason the clutch pawl 233 may stay in mesh with the clutch gear 237 so that the total taking rotary unit 233, 234, 235 remains connected for another full turn.

After the entry of the multiplicand factor into the series of wheels 242 (Fig. 23) has been completed, the proper tabulation key 13, Fig. 1, is depressed which causes the paper carriage 5 as well as the factor entering wheel 241 (Fig. 23) to be set into the chosen decimal place for entering the multiplier. Then the respective calculating keys 10 corresponding to the digits of the multiplier value are depressed so as to introduce the multiplier into the multiplier device 243 of the multiplying mechanism as well as into the respective column totalizer, as described above. Now the key 15 (Fig. 1) is depressed to form the end-product, whilst the locking mechanism 139, 141 for the operating bell crank 125, 142 is manually released by pressing the ear 135a (Fig. 14) of the catch 135 of the lever 125. The bell crank 125, 142 and its shoe 174 are returned to their normal positions by the spring 126, the bell crank releasing the blocking means 145, 147, 151, 161, 162, (Fig. 12) for the calculating slides 35 for return to normal by the spring 154, to reinstate the control of the calculating keys 10 over their respective calculating slides.

The bell crank 125, 142 on its return to normal also rocks the lever 117 (Figs. 5, 6 and 10), with its rocking tappet 115 counterclockwise, to their normal positions. At the end of the product total-taking the catch 107 (Fig. 10) is moved forcibly in the direction opposite to the arrow 111 against the action of spring 110 to cause the catch lever 107 to release the lip 105 of the slide 100, whereupon the slide 100 and the members 89, 86, 83, 81 and 75 are returned to their normal positions, as shown in Figs. 5, 7, 9 and 10, by the action of spring 78, during which return, the cam shoulder 113 of the slide 100 idly rocks the rocking tappet 115 against its spring 118. The machine is then ready again for normal figuring, that is, for additive and subtractive figuring as well as for total-taking from the column totalizers.

Having now particularly described and ascertained the nature of our said invention and in what manner the same is to be performed, we declare that what we claim is:

1. In a typewriter-calculating machine having a master-wheel mechanism, and totalizer elements engageable seriatim therewith, the combination with a set of numeral keys, and operation-controlling devices, one for each key and each device being power-operable in a cycle under control of said key, of factor-receiving wheels, a factor-entering master-wheel for said wheels, a train operable including a driving element for operating said factor-entering master-wheel, a control mechanism operable preparatory to entering a factor, and normally ineffective means, enabled by the operation of said preparatory control mechanism, for effecting operation of said train under control of said keys and power operable devices.

2. In a typewriter-calculating machine having a master-wheel mechanism and totalizer elements engageable seriatim therewith, the combination with a set of numeral keys, actuators for operating said master-wheel mechanism, and actuator-operation-controlling devices, one for each key and each device being power-operable in a cycle under control of said key, of factor-receiving wheels, a factor-entering master-wheel for said wheels, a train for operating said factor-entering master-wheel, a control mechanism operable preparatory to entering a factor, normally ineffective means, enabled by the operation of said control mechanism, for effecting operation of said train under control of said keys and power operable devices, and means conditioned by the operation of said control mechanism to suppress the operation of said actuators for the totalizer master-wheel mechanism.

3. In a typewriter-calculating machine having a master-wheel mechanism and totalizer elements engageable seriatim therewith, the combination with a set of numeral keys, actuators for operating said master-wheel mechanism, and actuator-operation-controlling devices, one for each key and each device being power operable in a cycle under control of said key, of factor-receiving wheels, a factor-entering master-wheel for said wheels, a train for operating said factor-entering master-wheel, a control mechanism operable preparatory to entering a factor, normally ineffective means enabled by the operation of said control mechanism for effecting operation of said train under control of said keys and power operable devices, means conditioned by the operation of said control mechanism to suppress the operation of said actuators for the totalizer master-wheel mechanism, and means for effecting operation of the totalizer master-wheel mechanism under control of said train when said actuators are suppressed.

4. In a machine of the character described, the combination with a set of value-keys and corresponding value recording-instrumentalities, of a movable member, means for effecting movement of said member in response to operation of any key, a set of stops on said member, a set of stops selectively projectable by said keys to intercept corresponding member stops to arrest the movement of said member in different positions, a set of operable elements for operating said instrumentalities, and means operable to move relatively said set of elements and one of said sets of stops so that the active stop encounters and thereby causes operation of the corresponding element.

5. A machine constructed according to claim 4, inclusive of a series of register gears, a master gear engageable with said register gears seriatim, and means operatively connecting said member to said master gear so that the latter is differentially rotated by the movements of said member to different positions.

6. In a machine of the character described, numeral-value keys, rotary units corresponding to the keys, means for power-cycling any unit in response to operation of its key, a universal member operable by any unit at a predetermined time in its cycle, another rotary unit and mechanism operable together therewith, and means for effecting power-cycling of said other unit in response to operation of said universal member, said last-named means including an operative connection between said universal member and other unit.

7. In a machine of the character described, numeral-value keys, rotary units corresponding to the keys, means for power-cycling any unit in response to operation of its key, a universal member operable by any unit at a predetermined time in its cycle, another rotary unit, a differential calculating device operable with said other unit, means for effecting cycling of said other unit in response to operation of said universal member resulting from operation of any of said keys, said last-named means including an operative connection between said universal member and other unit, and stop-means controlled by said keys to control said differential calculating device.

8. In a machine of the character described, numeral-value keys, rotary units corresponding to the keys, means for power-cycling any unit in response to operation of its key, a totalizer-master-wheel mechanism, actuators for said mechanism operable together with said units, a universal member operable by any unit at a predetermined time in its cycle, another rotary unit, a differential calculating device operable with said other unit, means for effecting cycling of said other unit in response to operation of said universal member resulting from operation of any of said keys, said last-named means including an operative connection between said universal member and other unit, stop-means controlled by said keys to control said differential calculating device, and means conditionable to suppress the operation of said actuators for the totalizer-master-wheel mechanism when said differential calculating device is used.

9. In a machine of the character described, the combination with a set of numeral keys, elements, one for each key, selectively power-operable under control of its key of a universal member by any of said elements, a factor entering differential mechanism, means releasable and ensuingly operable to actuate said differential mechanism, a releaser operable to release said means, normally ineffective means conditionable, preparatory to operating said keys, to connect operatively said universal member to said releaser, and stops for said differential mechanism controlled by said keys.

10. A typewriter calculating machine having denominationally ordered totalizer elements, a master-wheel engageable seriatim with said elements, a set of numeral keys and corresponding rotary units, means for cycling any unit in response to operation of its key, means enabling said cycling units to effect operation of said master-wheel, a series of factor wheels, a factor-entering master-wheel, a train movable to different positions for operating the factor-entering master-wheel differentially, means, including a device conditionable before entering a factor, for enabling any one of the first-named units, when it is cycled, to effect the movement of said train, means conditionable concomitantly with conditioning of said device to suppress effectivity of the means that enable the cycling units to effect operation of the first-named master wheel and stops controlled by said keys to limit the movements of said train to said positions.

11. In a typewriter-calculating machine having a master-wheel operable to set up numbers in different orders, the combination of a set of numeral keys, a set of type-operating levers corresponding to said keys, a support on which said levers are pivoted, a shaft having stops, means operable in response to operation of any key to rotate the shaft, shaft-arresting means controlled by the operated key to intercept the corresponding one of said shaft stops to arrest the shaft at a position to present the intercepted stop to and thereby select the type-operating lever corresponding to the key, means for relatively moving the support and shaft so that the presented stop engages and effects an operation of the selected type-operating lever, and means operable concurrently with the rotation of said shaft to said position to operate the master-wheel.

12. The combination with a typewriter having a framework, a carriage thereon, a totalizer on the carriage, numeral keys on the framework, a a totalizer-operating master-wheel mechanism on the framework, cam mechanism power operable under control of the keys, and means cooperable with the cam mechanism for operating the master-wheel mechanism of a set of multiplication-factor-receiving wheels on the framework, a factor-entering master-wheel mounted on the framework for operating upon the factor-receiving wheels seriatim, a control operable preparatory to entering a factor, means associated with said control to suppress said cooperable means, and factor-entering mechanism rendered capable, upon operation of said control, of operating under control of said keys and the key-controlled operation of said cam mechanism to impart differential rotary movements to said factor-entering master-wheel.

13. The combination with a typewriter having a framework, a carriage thereon, a totalizer on the carriage, numeral keys on the framework, a totalizer-operating master-wheel mechanism on the framework, cam mechanism operatively connected to the master-wheel mechanism and power operable under control of the keys, of a set of multiplication-factor-receiving wheels on the framework, a factor-entering master-wheel mounted on the framework for operating upon the factor-receiving wheels seriatim, factor-entering mechanism conditionable so as to be operable under control of said keys and the key-controlled operation of said cam mechanism to impart differential rotary movements to said factor-entering master-wheel, a preparatory key on the framework, means controlled by operation of said preparatory key to condition said factor-entering mechanism; and additional means likewise controlled by operation of said preparatory key to suppress the operative connection between the cam mechanism and the said first-named master wheel mechanism.

14. In a machine of the character described, the combination of a power drive; numeral keys; totalizer, cam mechanism operable in a cycle by said power drive in response to operation of a numeral key; a member cooperable with said cam mechanism at each cycle; a cam device; a clutch mechanism operable to connect said cam device to said power drive for a resulting cycle of said cam device; a control operable before operation of any key; means responsive to operation of said control to connect said member to said clutch; multiplication-factor-receiving means; factor-entering means cooperable with said cam device and differentially controllable by said keys to enter the value of any operated key into said factor receiving means; and connections between the factor entering means and the totalizer to enter the value of any operated key into the totalizer incident to the entry of said value in the factor-receiving means.

15. In a machine of the character described, the combination with a power shaft; a set of numeral keys; and elements, one for each key, selectively power-operable under control of said keys; of a number-entering mechanism; a second power means tensioned by the power shaft and which may be brought into operation for actuating said mechanism in number-entering strokes; means normally latching said second power means out of operation; means connectible with the power shaft to release said latching means and free said second power means for operation; a device operable by any of said key-controlled elements to render said power-connectible release means effective; and stop devices operative under control of said keys to differentially arrest the strokes of said number-entering mechanism.

16. A typewriting-accounting machine having a totalizer; numeral keys; a cam mechanism individual to each numeral key; a power drive effective in response to the operation of any numeral key, to impart a cycle of rotation to the corresponding cam mechanism; differential mechanism cooperable with the cam mechanism of any depressed key to enter into the totalizer a value corresponding to that of the depressed key; a multiplication factor-receiving device; normally ineffective factor-entering mechanism including key-set stops; an additional cam, and means controlled thereby operable by said power drive to condition the factor-entering mechanism to respond to the operation of any numeral key, to set up the value of each depressed key in said factor-receiving device; means normally latching said additional cam mechanism out of operation; a universal member operable by any of the numeral key controlled cam mechanisms; a normally ineffective connection between the universal member and the latching means for said additional cam mechanism; normally idle means to suppress the operation of the differential mechanism; and a control operable preparatory to a factor-entering operation of the numeral keys to shift the normally ineffective connection to effective position, and to operate the normally idle suppressing means to render the differential mechanism inoperative.

17. In a typewriting-accounting machine having a totalizer comprising a plurality of denominational wheels; numeral keys; differential mechanism individual to the respective numeral keys and common to the respective totalizer wheels; a power driven unit individual to each numeral key and operable incident to depression of its key to control the differential mechanism for the entry of digits, one by one, into the totalizer; a differentially movable element; normally latched power driven means to actuate said element; a normally idle power driven unit additional to the first-named units; and means controlled thereby to release said normally latched power driven means for operation; of a multiplying mechanism, including a series of wheels into which are entered the factors of a multiplication, and a factor-entering master wheel; and means to utilize the differentially movable element to differentially control the rotation of the factor entering master wheel, including numeral key-controlled means to variously arrest the differentially movable element; a universal member operable by any of the power driven units of the respective numeral keys; normally idle means operable by the universal member to render said additional power driven unit effective upon said means controlled by said additional normally idle power-driven unit, to release said normally latched power-driven means for operation; a preparatory key, means controlled thereby to condition the normally idle universal member operated means for operation; and means also controlled by said preparatory key to suppress the numeral key controlled differential mechanism.

18. A typewriting-accounting machine having a totalizer; numeral keys; rotary units corresponding with the keys; means to power-cycle any unit in response to operation of its key; a differential mechanism to enter amounts digit by digit on the totalizer under control of the respective rotary units; another rotary unit; a differential calculating device operable under control of said last-named other unit; means controlled by said numeral keys to variously arrest said differential calculating device; a universal member operable by any of the numeral key-controlled rotary units; a normally ineffective connection between said other unit and the universal member; a preparatory key; power-cycled means controlled by said preparatory key to shift the connection to its effective position for operation by said universal member to effect cycling of said other unit; and means operable by said preparatory key-controlled power-cycled means, to suppress the operation of the first-named differential mechanism when the differential calculating device is conditioned for operation.

19. In a power-driven typewriting-accounting machine, the combination with a set of calculating keys; a normally idle power-driven unit individual to and controlled by each calculating key; a totalizer including a plurality of totalizer wheels; a master wheel for the totalizer, the totalizer and master wheel being relatively shiftable axially, and a differential member individual to each power driven unit for control thereby to enter digits into the totalizer corresponding to the values of the keys depressed; of factor-receiving wheels, a factor-entering master wheel; a key-controlled power driven train to operate the factor-entering master wheel; another normally idle power-driven unit to release the key-controlled power-driven train for operation, and to restore it to its initial position; a control means operable as a preliminary to entering a factor on the factor-receiving wheels; means operable by the control means to suppress the operation of the differential members; a universal member operable by any of the calculating key-controlled power-units; and normally ineffective means positioned by said control mechanism to enable said other power-driven unit to be power driven under control of the depressed calculating keys and the universal member.

ROBERT ANSCHÜTZ.
ERNST HUGO KÄMMEL.